United States Patent
Okamoto et al.

(10) Patent No.: US 10,160,458 B2
(45) Date of Patent: Dec. 25, 2018

(54) DRIVING CHARACTERISTIC MEASUREMENT APPARATUS

(71) Applicant: MITSUBISHI ELECTRIC CORPORATION, Tokyo (JP)

(72) Inventors: Shogo Okamoto, Tokyo (JP); Takuji Morimoto, Tokyo (JP); Kimika Ikegami, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 15/578,916

(22) PCT Filed: Jun. 2, 2015

(86) PCT No.: PCT/JP2015/065926
§ 371 (c)(1),
(2) Date: Dec. 1, 2017

(87) PCT Pub. No.: WO2016/194147
PCT Pub. Date: Dec. 8, 2016

(65) Prior Publication Data
US 2018/0148066 A1 May 31, 2018

(51) Int. Cl.
*B60W 40/00* (2006.01)
*B60W 40/09* (2012.01)
(Continued)

(52) U.S. Cl.
CPC ............ *B60W 40/09* (2013.01); *B60W 40/06* (2013.01); *G06K 9/00845* (2013.01); *G08G 1/0129* (2013.01); *B60W 2550/14* (2013.01)

(58) Field of Classification Search
CPC .. B60W 40/09; B60W 40/06; B60W 2550/14; G06K 9/00845; G08G 1/0129
(Continued)

(56) References Cited

U.S. PATENT DOCUMENTS 9,014,955 B2 * 4/2015 Sakakibara .......... G08G 1/0116
701/118
9,162,686 B2 * 10/2015 Ogawa .................... G01P 1/103
(Continued)

FOREIGN PATENT DOCUMENTS

JP 2002-319087 A 10/2002
JP 2007-213324 A 8/2007
(Continued)

OTHER PUBLICATIONS

International Search Report, issued in PCT/JP2015/065926, PCT/ISA/210, dated Sep. 1, 2015.

*Primary Examiner* — Daryl Pope
(74) *Attorney, Agent, or Firm* — Birch, Stewart, Kolasch & Birch, LLP

(57) ABSTRACT

When the number of pieces of traveling data belonging to the same category as a category of the current traveling data is equal to or greater than a first number being predetermined, a driving characteristic measurement apparatus selects the traveling data, and, when the number of pieces of the traveling data is less than the first number, selects traveling data whose number of pieces is not less than the first number, from among traveling data belonging to a category similar to the category of the current traveling data. The driving characteristic measurement apparatus measures driving characteristics on a currently traveling road using the selected traveling data.

15 Claims, 18 Drawing Sheets

(51) Int. Cl.
*B60W 40/06* (2012.01)
*G06K 9/00* (2006.01)
*G08G 1/01* (2006.01)

(58) Field of Classification Search
USPC .............. 340/435, 436, 438, 439, 425.5
See application file for complete search history.

(56) References Cited

U.S. PATENT DOCUMENTS 9,183,743 B2 * 11/2015 Vahidi ................ G08G 1/0141
9,412,272 B2 * 8/2016 Lee ........................ G08G 1/07
9,947,218 B2 * 4/2018 Murai ................ G08G 1/0112

FOREIGN PATENT DOCUMENTS

| JP | 2008-18872 A | 1/2008 |
|----|--------------|--------|
| JP | 2010-152497 A | 7/2010 |
| JP | 2010-230377 A | 7/2010 |
| JP | 2010-230377 A | 10/2010 |
| JP | 2011-85431 A | 4/2011 |
| WO | WO 2016/120994 A1 | 8/2016 |

* cited by examiner

Traveling Data Category X

Traveling Data Category Y

Traveling Data Category Z

DRIVING CHARACTERISTIC MEASUREMENT APPARATUS

TECHNICAL FIELD

The present invention relates to a driving characteristic measurement apparatus for measuring driving characteristics of drivers for driving support.

BACKGROUND ART

Inventions according to Patent Literatures 1 and 2 relate to driving support apparatuses for supporting driving of vehicles.

A driving support apparatus as described in Patent Literature 1 detects information on driving maneuvers with respect to components such as a steering wheel, an accelerator, a brake, and a blinker, and calculates a distribution of the detected information as behavior information of a driver. Furthermore, the driving support apparatus extracts, as a travel situation, from a position of the vehicle and map data, the type, width or shape of a road near the vehicle, the position of an intersection, the position and type of a traffic light or road sign, a mark drawn on a road, such as a crosswalk or a stop line. The driving support apparatus further selects a distribution that serves as a reference for determining whether the driver is safely driving on the basis of the extracted traveling situation, and determines whether the driver is safely driving on the basis of the difference between the behavior information and a reference distribution.

Moreover, the driving support apparatus stores behavior information of the driver as a history for each travel situation, searches for behavior information in a situation similar to a travel situation in a traveling direction, from the history, and when the found behavior information is determined to be not carrying out safe driving or has less frequency of safely driving, notifies the driver to perform safe driving.

A driving support apparatus as described in Patent Literature 2 includes: travel state detecting means for detecting a travel state of a host vehicle; surrounding condition detecting means for detecting a situation surrounding the host vehicle; acceleration/deceleration operation detecting means for detecting an acceleration or deceleration operation on the host vehicle; driving characteristic grasping means for grasping driving characteristics by classifying a relation between the travel state of the host vehicle and the situation surrounding the host vehicle in the case where the acceleration or deceleration operation is detected by the acceleration/deceleration operation detecting means and the situation surrounding the host vehicle, into a plurality of element characteristics; and driving support means for providing driving support to a driver on the basis of at least one of the element characteristics in the driving characteristics grasped by the driving characteristic grasping means.

The driving characteristic grasping means holds the plurality of element characteristics, and, from among the plurality of held element characteristics, selects an element characteristic most approximating a relation between the travel state of the host vehicle and the situation surrounding the host vehicle when the acceleration or deceleration operation is detected by the acceleration/deceleration operation detecting means. The driving characteristic grasping means classifies each relation between a travel state of the host vehicle and a situation surrounding the host vehicle in the case where the acceleration or deceleration operation has been detected in past driving, into a plurality of groups, according to the degree of similarity therebetween, and measures a characteristic of each of the groups, thereby obtaining the plurality of element characteristics. The driving support means carries out driving support for the driver on the basis of the element characteristics measured by the driving characteristic grasping means.

CITATION LIST

Patent Literatures

Patent Literature 1: Japanese Patent Application Publication No. 2006-343904.
Patent Literature 2: Japanese Patent Application Publication No. 2008-18872.

SUMMARY OF INVENTION

Technical Problem

In the above Patent Literature 1, there is the problem that, when determining whether a driver is safely driving, behavior information in a situation similar to a travel situation in the traveling direction is retrieved from the history and used, however, the number of behavior information retrieved from the history is not mentioned, and when the behavior information in the situation similar to the travel situation in the traveling direction is little, credibility of the behavior information is low and whether the driver is driving safely cannot be appropriately determined.

In the above Patent Literature 2, when driving characteristics are measured for driving support, each relation between a travel state of a host vehicle in which the driving support apparatus is mounted and a situation surrounding the host vehicle is classified into a plurality of groups according to the degree of similarity therebetween, and thereby used for measurement of driving characteristics; however, in the case where the number of times of traveling in the past in a group to which the current driving belongs is small, characteristics are not measured for each group, and characteristics are measured on the basis of all driving traveled in the past regardless of groups. Therefore, there is a problem that credibility of the driving characteristics is low and appropriate driving support cannot be performed.

This invention has been devised in order to solve the above problems, and it is an object of the present invention to measure driving characteristics with high credibility even in a case where the number of times of traveling in the same road situation in the past as that of the currently traveling road is small, or never been traveled at all.

Solution to Problem

A driving characteristic measurement apparatus according to the invention includes: an information acquiring unit to acquire traveling data that includes both information on a situation of a road on which a vehicle is currently traveling and information on a driving maneuver of the vehicle; a traveling data category determining unit to determine a category of current traveling data on a basis of the information on the situation of the road included in the current traveling data acquired by the information acquiring unit; a traveling data storage to assign the category determined by the traveling data category determining unit to the current traveling data for storage therein; a traveling data extractor to extract traveling data belonging to a same category as the category of the current traveling data, from the traveling data storage; a similar traveling data extractor to extract traveling data belonging to a category similar to the category of the current traveling data, from the traveling data storage; a traveling data selector to select the traveling data extracted by the traveling data extractor when the number of pieces of the traveling data extracted by the traveling data extractor is equal to or greater than a first number being predetermined, and to, when the number of said pieces of the traveling data is less than the first number, select traveling data whose number of pieces is not less than the first number, from among the traveling data extracted by the similar traveling data extractor; and a driving characteristic measurement unit to measure a driving characteristic on a current traveling road, using the traveling data selected by the traveling data selector.

Advantageous Effects of Invention

According to the invention, when the number of pieces of traveling data belonging to the same category as a category of the current traveling data is equal to or greater than a first number being predetermined, the traveling data is selected, and, when the number of pieces of the traveling data is less than the first number, traveling data whose number of pieces is not less than the first number is selected such that the selected traveling data belongs to a similar category to the category of the current traveling data. Using the selected traveling data, driving characteristics on a currently driving road are measured. Therefore, driving characteristics with high credibility can be measured using past traveling data of a road situation similar to the currently traveling road situation even in a case where the number of times of traveling in the same road situation in the past as that of the currently traveling road is small, or never been traveled at all.

DESCRIPTION OF EMBODIMENTS

To describe the invention further in detail, embodiments for carrying out the invention will be described below along the accompanying drawings.

First Embodiment

When the number of times of traveling in the past the same road situation as the current road situation is small, a driving characteristic measurement apparatus according to a first embodiment of the present invention measures driving characteristics in the current driving using traveling data in a road situation similar to the current road situation and being large in the number of times of traveling in the past.

Figure 1:
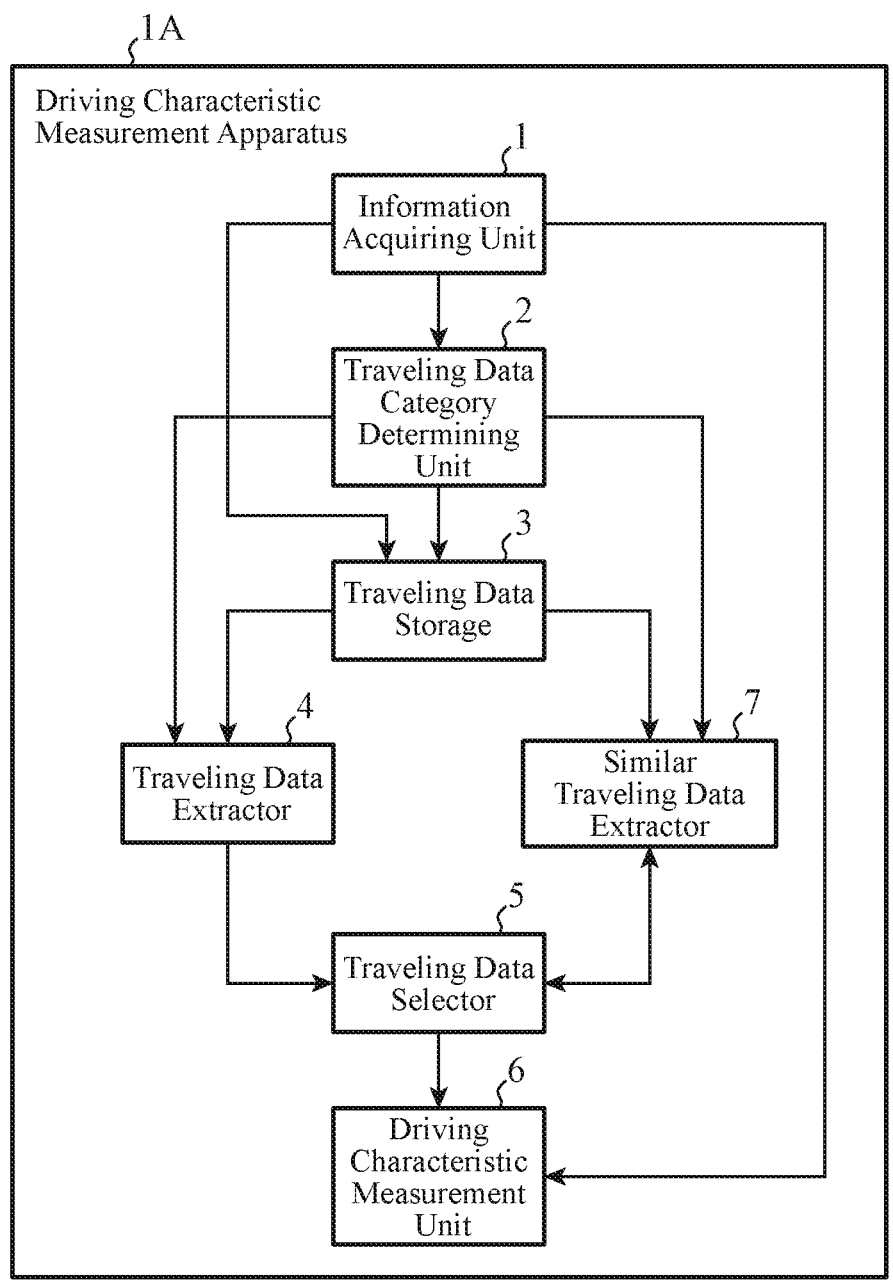
FIG. 1 is a block diagram illustrating an exemplary configuration of a driving characteristic measurement apparatus according to a first embodiment of the invention.

FIG. 1 is a block diagram illustrating a configuration of a driving characteristic measurement apparatus 1A according to the first embodiment for carrying out the invention.

The driving characteristic measurement apparatus 1A illustrated in FIG. 1 is mounted on a vehicle. The driving characteristic measurement apparatus 1A includes: an information acquiring unit 1 configured to acquire traveling data including information on a situation of a road on which a vehicle is currently traveling and information on a driving maneuver of the vehicle; a traveling data category determining unit 2 configured to determine a category of the current traveling data on the basis of the information on the situation of the road included in the current traveling data acquired by the information acquiring unit 1; a traveling data storage 3 configured to assign the category determined by the traveling data category determining unit 2 to the current traveling data for storage therein; a traveling data extractor 4 configured to extract traveling data belonging to the same category as the category of the current traveling data from the traveling data storage 3; a similar traveling data extractor 7 configured to extract traveling data belonging to a category similar to the category of the current traveling data from the traveling data storage 3; a traveling data selector 5 configured to, when the number of pieces of the traveling data extracted by the traveling data extractor 4 is equal to or greater than a predetermined first number, select the traveling data, and configured to, when the number of pieces of the traveling data is less than the first number, select traveling data whose number of pieces is not less than the first number, from among the traveling data extracted by the similar traveling data extractor 7; and a driving characteristic measurement unit 6 configured to measure a driving characteristic on the currently traveling road using the traveling data selected by the traveling data selector 5.

Figure 17A:
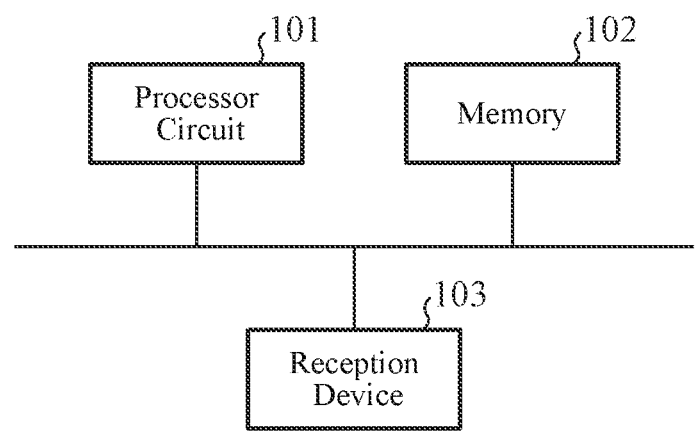
FIGS. 17A and 17B are hardware configuration diagrams of the driving characteristic measurement apparatus according to the respective embodiments of the present invention.
Figure 17B:
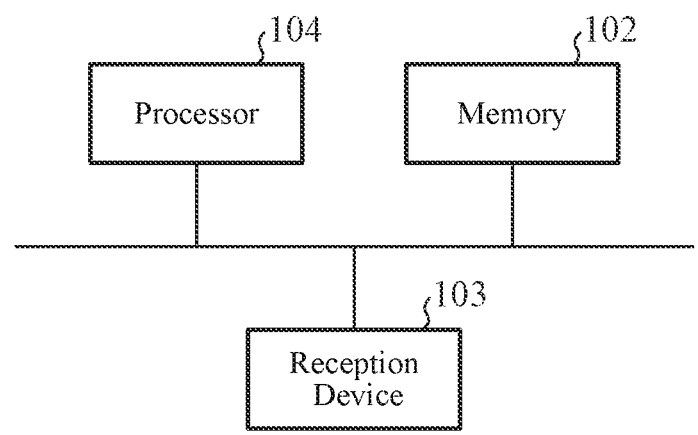

FIGS. 17A and 17B are hardware configuration diagrams of the driving characteristic measurement apparatus according to the respective embodiments of the present invention.

The information acquiring unit 1 in the driving characteristic measurement apparatus 1A corresponds to a reception device 103, and the traveling data storage 3 corresponds to a memory 102.

Each function of the traveling data category determining unit 2, the traveling data extractor 4, the traveling data selector 5, the driving characteristic measurement unit 6, and the similar traveling data extractor 7 in the driving characteristic measurement apparatus 1A is implemented by a processor circuit 101. That is, the driving characteristic measurement apparatus 1A includes the processor circuit 101 configured to perform processing as illustrated in a flowchart of FIG. 2 to be described later. The processor circuit 101 may be dedicated hardware as illustrated in FIG. 17A, or may be a processor 104 configured to execute a program stored in the memory 102 as illustrated in FIG. 17B.

When the processor circuit 101 is dedicated hardware as illustrated in FIG. 17A, the processor circuit 101 corresponds to, for example, a single circuit, a composite circuit, a programmed processor, a parallel programmed processor, an application specific integrated circuit (ASIC), a field-programmable gate array (FPGA), or a combination thereof. Functions of the traveling data category determining unit 2, the traveling data extractor 4, the traveling data selector 5, the driving characteristic measurement unit 6, and the similar traveling data extractor 7 may be implemented by a plurality of processor circuits 101. Alternatively, the functions may be collectively implemented by one processor circuit 101.

Figure 2:
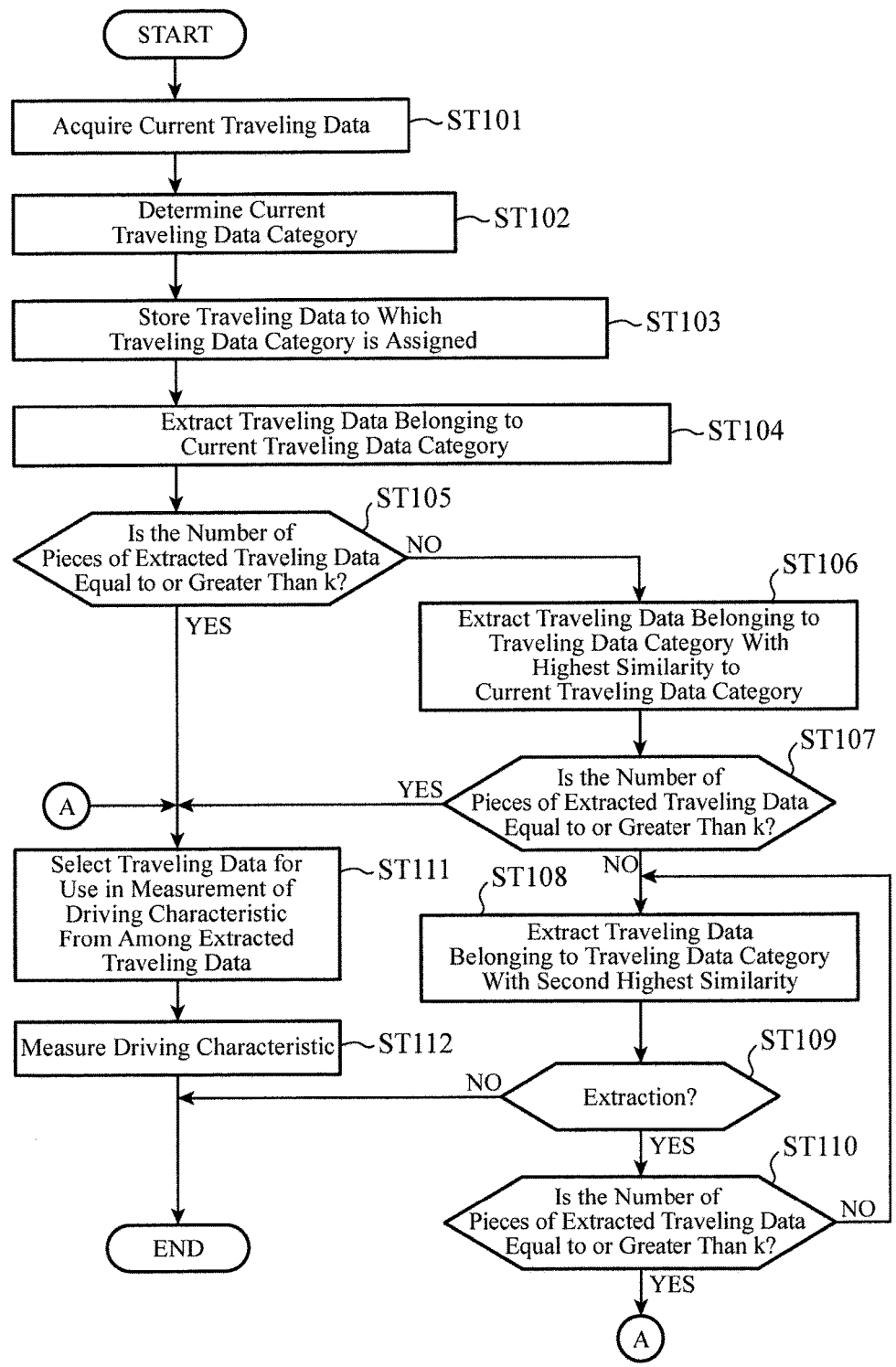
FIG. 2 is a flowchart illustrating exemplary operations of the driving characteristic measurement apparatus according to the first embodiment.

As illustrated in FIG. 17B, when the processor circuit 101 is the processor 104, functions of the traveling data category determining unit 2, the traveling data extractor 4, the traveling data selector 5, the driving characteristic measurement unit 6, and the similar traveling data extractor 7 are implemented by software, firmware, or a combination of software and firmware. Software and firmware are described as a program and stored in the memory 102. The processor 104 reads and executes the program stored in the memory 102 and thereby implements functions of the respective units. That is, the driving characteristic measurement apparatus 1A includes the memory 102 configured to store the program for execution of each step as illustrated in the flowchart of FIG. 2, to be described later, as a result when the program is executed by the processor 104. The program also causes a computer to execute a procedure or a method of the traveling data category determining unit 2, the traveling data extractor 4, the traveling data selector 5, the driving characteristic measurement unit 6, and the similar traveling data extractor 7.

Here, the processor 104 is, for example, a central processing unit (CPU), a central processor, a processing device, an arithmetic device, a microprocessor, a microcomputer, a digital signal processor (DSP), or the like.

The memory 102 may be a nonvolatile or volatile semiconductor memory such as a random access memory (RAM), a read only memory (ROM), a flash memory, an erasable programmable ROM (EPROM), an electrically EPROM (EEPROM), or a solid state drive (SSD), a magnetic disc such as a hard disc or a flexible disc, or an optical disc such as a mini disc, a compact disc (CD), or a digital versatile disk (DVD).

Note that a part of functions of the traveling data category determining unit 2, the traveling data extractor 4, the traveling data selector 5, the driving characteristic measurement unit 6, and the similar traveling data extractor 7 may be implemented by dedicated hardware while another part may be implemented by software or firmware. In this manner, the processor circuit 101 in the driving characteristic measurement apparatus 1A can implement the above functions by hardware, software, firmware, or a combination thereof.

When the number of pieces of traveling data is equal to or greater than k, the driving characteristic measurement apparatus 1A can use the traveling data for measurement of driving characteristics. In the present embodiment, description will be given assuming that k which is the "first number" is k=50. Likewise in second to eighth embodiments, k is assumed to be k=50.

FIG. 2 is a flowchart illustrating operations in the first embodiment for carrying out the invention. The driving characteristic measurement apparatus 1A repeats operations as illustrated in the flowchart of FIG. 2 during the period from when an ignition key of a vehicle mounted with the driving characteristic measurement apparatus 1A is turned on until it is turned off.

In step ST101, the information acquiring unit 1 acquires traveling data. Traveling data includes information on the situation of a road on which a host vehicle is traveling, acquired from a sensor or the like installed in the vehicle, such as the number of lanes, the type of the road, or the shape of the road, or information on a vehicle around the host vehicle. Traveling data also includes information on driving maneuvers of the host vehicle, such as speed, steering information, or indicator information. Traveling data may further include information such as time information or weather information.

In step ST102, the traveling data category determining unit 2 determines a traveling data category of the situation of the currently traveling road, on the basis of information on a road situation included in the traveling data acquired by the information acquiring unit 1, for example, on the basis of a road type, the number of lanes, or surrounding vehicle information.

Figure 3A:
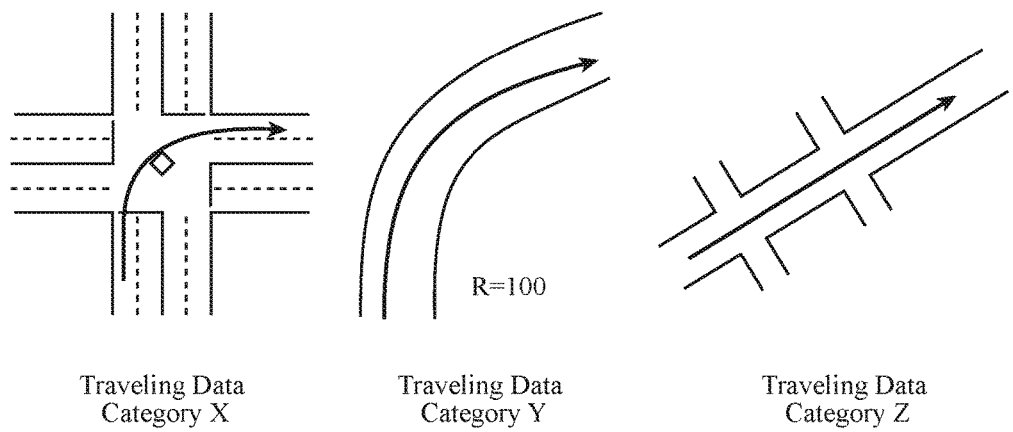
FIGS. 3A and 3B are image diagrams illustrating different traveling data categories in the first embodiment.
Figure 3B:
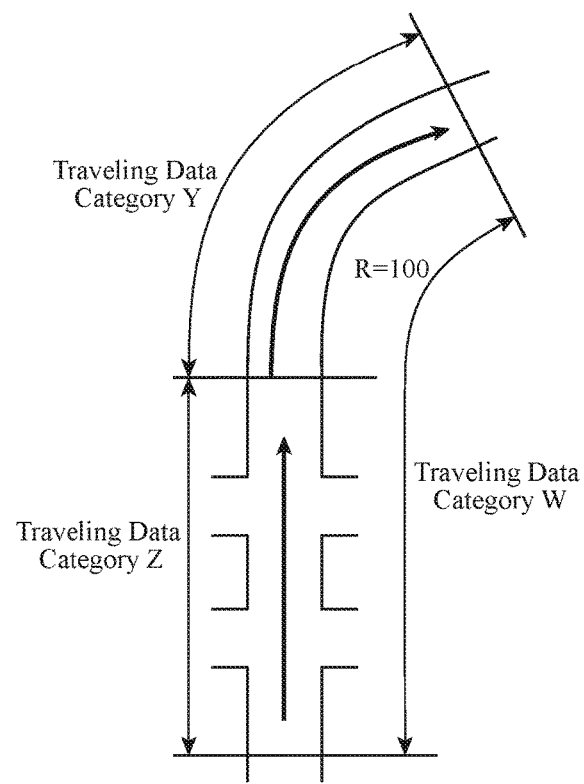

FIGS. 3A and 3B are image diagrams illustrating different traveling data categories.

In FIG. 3A, for example, traveling data categories include a traveling data category X representing an intersection of two lanes on one side, a traveling data category Y representing a curve with a curvature radius of R=100, and a traveling data category Z representing a straight road for a certain section.

A determination condition of traveling data categories may be specified in advance or may be changed during operation of the present driving characteristic measurement apparatus 1A. For example, as illustrated in FIG. 3B, in a case of traveling on a road such that two road situations having been determined as the traveling data categories Y and Z in the past are connected to each other, the traveling data category determining unit 2 generates a new traveling data category W and its determination condition, and thereafter determines the traveling data category by adding the generated determination condition.

Furthermore, for example, in a case of turning right at an intersection of three lanes on one side, the traveling data category determining unit 2 may generate a new traveling data category representing an intersection of three lanes on one side and a determination condition in addition to the traveling data categories X, Y, and Z.

Furthermore, for example, when a road of the traveling data category Z is congested, the traveling data category determining unit 2 may generate, in addition to the traveling data categories X, Y, and Z, a new traveling data category representing a straight road for a congested certain section and generate a determination condition.

In the present embodiment, the traveling data category determining unit 2 determines that the current traveling data acquired by the information acquiring unit 1 is in a traveling data category A (step ST102).

In step ST103, the traveling data storage 3 assigns the traveling data category A determined by the traveling data category determining unit 2 to the traveling data acquired by the information acquiring unit 1 and thereby stores the traveling data category A.

In step ST104, the traveling data extractor 4 extracts traveling data belonging to the traveling data category A in the current traveling road situation determined by the traveling data category determining unit 2 from the traveling data storage 3.

Figure 4:
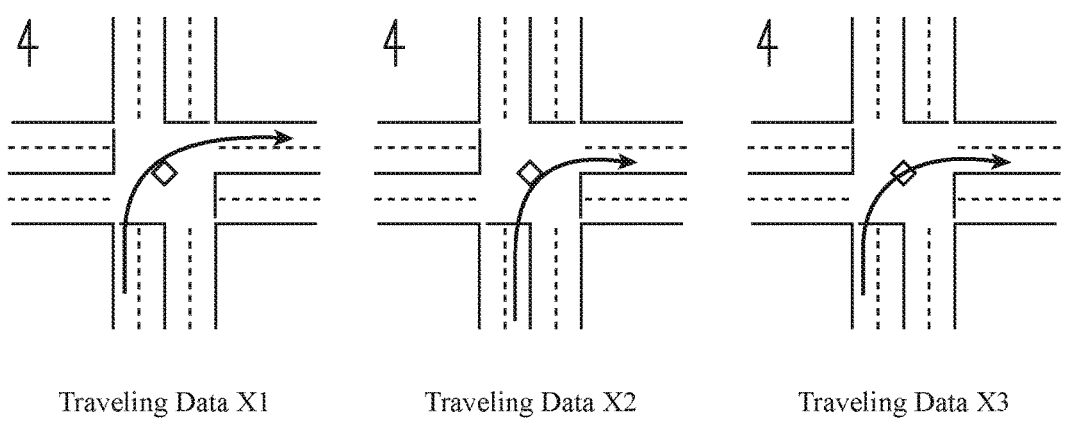
FIG. 4 is an image diagram illustrating a plurality of pieces of traveling data determined as being in the same traveling data category in the first embodiment.

FIG. 4 is a diagram illustrating an example of traveling data extracted in step ST104. FIG. 4 is an image diagram illustrating a plurality of pieces of traveling data determined as being in the same traveling data category. For example, it is assumed that the current traveling data is determined as being in the traveling data category X representing an intersection of two lanes on one side. Furthermore, for example, assuming traveling in the past the intersection of two lanes on one side in directions of three types of arrows illustrated in FIG. 4, it is assumed that the traveling data storage 3 stores three pieces of traveling data including traveling data X1 of turning from a left lane to another left lane, traveling data X2 turning from a right lane to another right lane, and traveling data X3 turning from the left lane to the right lane. In this case, the traveling data extractor 4 extracts traveling data X1, X2, X3 from the traveling data storage 3 as traveling data belonging to the current traveling data category X.

In step ST105, if the number of pieces of traveling data belonging to the current traveling data category extracted in step ST104 is equal to or greater than k ("YES" in step ST105), the traveling data selector 5 performs an operation of step ST111. The traveling data selector 5 performs an operation of step ST111 for example if the number of pieces of traveling data belonging to the traveling data category A is 60.

In step ST111, the traveling data selector 5 selects k or more pieces of traveling data extracted in step ST104 as traveling data for measuring driving characteristics. If the number of pieces of traveling data belonging to the traveling data category A extracted in step ST105 is 60, for example, the traveling data selector 5 selects 60 pieces of traveling data.

In step ST112, the driving characteristic measurement unit 6 measures driving characteristics using the traveling data selected in step ST111. For example, if the traveling data selector 5 has selected traveling data belonging to the traveling data category A in step ST111, the driving characteristic measurement unit 6 measures driving characteristics in the current travel classified as traveling data category A by using the traveling data belonging to the traveling data category A.

In step ST105, if the number of pieces of traveling data belonging to the current traveling data category extracted in step ST104 is less than k ("NO" in step ST105), the similar traveling data extractor 7 performs an operation of step ST106. For example, if there are five pieces of traveling data belonging to the traveling data category A extracted by the traveling data extractor 4, the similar traveling data extractor 7 performs an operation of step ST106.

In step ST106, the similar traveling data extractor 7 extracts from the traveling data storage 3 traveling data belonging to a traveling data category with the highest similarity to the current traveling data category, that is, a traveling data category most similar to the current traveling data category. In the present embodiment, a traveling data category with the highest similarity to the traveling data category A is a traveling data category B, a traveling data category with the second highest similarity is a traveling data category C, and a traveling data category with the third highest similarly is a traveling data category D.

The degree of similarity represents the degree of similarity between traveling data categories from information on roads such as the road type, the number of lanes, or the shape of a road included in the traveling data acquired by the information acquiring unit 1.

A criterion for determining similarity may be determined in advance or may be changed at any time during operation of the present driving characteristic measurement apparatus 1A.

The determination criterion is, for example, to determine an intersection of two lanes on one side and an intersection of three lanes on one side, or a congested highway of two lanes and a congested national road of two lanes are determined to be in traveling data categories with a high degree of similarity. Contrarily, a narrow road in a residential area and a highway are determined to be in traveling data categories with a low degree of similarity.

Furthermore, as described in FIG. 3B, when a traveling data category and its determination condition are changed, a criterion for determining similarity may also be changed in accordance with the change.

In step ST107, if the number of pieces of traveling data belonging to a traveling data category having the highest similarity to the current traveling data category extracted in step ST106 is equal to or greater than k ("YES" in step ST107), the traveling data selector 5 performs an operation of step ST111. For example, if the number of pieces of traveling data belonging to the traveling data category B extracted by the similar traveling data extractor 7 in step ST106 is 60, the traveling data selector 5 performs an operation of step ST111.

In step ST111, the traveling data selector 5 selects k or more pieces of traveling data extracted in step ST106 as traveling data for measuring driving characteristics. For example if the number of pieces of traveling data belonging to the traveling data category B extracted in step ST106 is 60, the traveling data selector 5 selects 60 pieces of traveling data.

In step ST112, the driving characteristic measurement unit 6 measures driving characteristics using the traveling data selected in step ST111. For example, if the traveling data selector 5 has selected traveling data belonging to the traveling data category B in step ST111, the driving characteristic measurement unit 6 measures driving characteristics in the current travel classified as the traveling data category A by using the traveling data belonging to the traveling data category B.

In step ST107, when the number of pieces of the traveling data belonging to the traveling data category having the highest similarity to the current traveling data category extracted in step ST106 is less than k ("NO" in step ST107), the similar traveling data extractor 7 performs an operation of step ST108. For example, if the number of pieces of traveling data belonging to the traveling data category B is 20, the similar traveling data extractor 7 performs an operation of step ST108.

In step ST108, the similar traveling data extractor 7 extracts traveling data belonging to a traveling data category with the second highest similarity to the current traveling data category. For example, the similar traveling data extractor 7 extracts traveling data belonging to the traveling data category C having the second highest similarity next to the traveling data category B to the traveling data category A.

If traveling data in a traveling data category cannot be extracted in step ST108, that is, if a traveling data category having the second highest similarity to the current traveling data category does not exist in the traveling data storage 3 ("NO" in step ST109), the similar traveling data extractor 7 terminates processing. For example, if the traveling data category C having the second highest similarity to the traveling data category A next to the traveling data category B does not exist, the similar traveling data extractor 7 terminates processing. In this case, driving characteristics are not measured.

If a traveling data category can be extracted in step ST108, that is, if a traveling data category having the second highest similarity to the current traveling data category exists in the traveling data storage 3 ("YES" in step ST109), the similar traveling data extractor 7 performs an operation of step ST110. For example, when there is a traveling data category C having the second highest similarity to the traveling data category A next to the traveling data category B, the traveling data selector 5 performs an operation of step ST110.

In step ST110, when the number of pieces of the traveling data belonging to the traveling data category having the second highest similarity to the current traveling data category extracted in step ST108 is equal to or greater than k ("YES" in step ST110), the traveling data selector 5 performs an operation of step ST111. For example, if the number of pieces of traveling data belonging to the traveling data category C is 60, the traveling data selector 5 performs an operation of step ST111.

In step ST111, the traveling data selector 5 selects k or more pieces of traveling data extracted in step ST108 as traveling data for measuring driving characteristics. For example, if the number of pieces of traveling data belonging to the traveling data category C extracted in step ST108 is 70, the traveling data selector 5 selects 70 pieces of traveling data.

In step ST112, the driving characteristic measurement unit 6 measures driving characteristics using the traveling data selected in step ST111. For example, if the traveling data selector 5 has selected traveling data belonging to the traveling data category C in step ST111, the driving characteristic measurement unit 6 measures driving characteristics in the current travel classified as traveling data category A by using the traveling data belonging to the traveling data category C.

In step ST110, when the number of pieces of the traveling data belonging to the traveling data category having the second highest similarity to the current traveling data category extracted in step ST108 is less than k ("NO" in step ST110), the similar traveling data extractor 7 performs an operation of step ST108. For example, if the number of pieces of traveling data belonging to the extracted traveling data category C is 20, the similar traveling data extractor 7 performs an operation of step ST108.

In step ST108, the similar traveling data extractor 7 extracts traveling data belonging to a traveling data category having the third highest similarity to the current traveling data category. For example, the similar traveling data extractor 7 extracts traveling data belonging to the traveling data category D having a higher similarity to the traveling data category A next to the traveling data categories B and C.

In steps ST108, ST109, and ST110, the similar traveling data extractor 7 repeats extracting a traveling data category and determining the number of pieces of traveling data in descending order of similarity to the current traveling data category as long as there is a traveling data category having similarity of a certain level or more to the current traveling data category. In the present embodiment, a traveling data category having similarity of a certain level or more to the current traveling data category is similar to a degree that driving characteristics with high credibility can be measured. On the other hand, since from a traveling data category having similarity of less than a certain level to the current traveling data category driving characteristics with high credibility cannot be measured, the traveling data selector 5 does not select traveling data and the driving characteristic measurement unit 6 does not measure driving characteristics.

Note that also in the second to eighth embodiments, similarly to the present embodiment, it is assumed that the current traveling data is classified to the traveling data category A, and in descending order of similarity to the traveling data category A, traveling data categories are referred to as a traveling data category B, a traveling data category C, and a traveling data category D.

For example, the driving characteristic measurement unit 6 measures average time series data of the vehicle speed at the time of passing an intersection using time series data of the vehicle speed at the time of passing an intersection included in k or more pieces of traveling data belonging to the traveling data category X and regards the data as driving characteristics of a driver.

The driving characteristic measured by the driving characteristic measurement unit 6 is used for driving diagnosis in a driving support device, for example. A driving support device performs driving diagnosis such as whether a timing a driver accelerates or decelerates has been appropriate for example by comparing the above-mentioned average time series data of the vehicle speed at the time of passing intersection with the ideal time series data of the vehicle speed at the time of passing the intersection.

Furthermore, the driving characteristic measured by the driving characteristic measurement unit 6 is used for automatic driving of the vehicle in the driving support device, for example. The driving support device controls behavior of the vehicle in conformity with the timing at which the driver accelerates or decelerates using the above-mentioned average time series data of the vehicle speed at the time of passing the intersection, thereby implementing automatic driving corresponding to preference of the driver.

According to the first embodiment as described above, the driving characteristic measurement apparatus 1A includes: the information acquiring unit 1 configured to acquire traveling data including information on a situation of a road on which a vehicle is currently traveling and information on a driving maneuver of the vehicle; the traveling data category determining unit 2 configured to determine a category of the current traveling data on the basis of the information on the situation of the road included in the current traveling data acquired by the information acquiring unit 1; the traveling data storage 3 configured to assign the category determined by the traveling data category determining unit 2 to the current traveling data for storage therein; the traveling data extractor 4 configured to extract traveling data belonging to the same category as the category of the current traveling data from the traveling data storage 3; the similar traveling data extractor 7 configured to extract traveling data belonging to a category similar to the category of the current traveling data from the traveling data storage 3; the traveling data selector 5 configured to, when the number of pieces of the traveling data extracted by the traveling data extractor 4 is equal to or greater than a first number being predetermined, select the traveling data, and configured to, when the number of pieces of the traveling data is less than the first number, select traveling data whose number of pieces is not less than the first number, from among the traveling data extracted by the similar traveling data extractor 7; and the driving characteristic measurement unit 6 configured to measure a driving characteristic on the currently traveling road, using the traveling data selected by the traveling data selector 5. Accordingly, even in a case where the number of times of traveling in the current road situation is small, or never been traveled at all, past traveling data having a road situation similar to the current road situation and having a large number of traveling times is extracted and used for measurement of driving characteristics. Therefore, it is possible to measure driving characteristics with high credibility even on a road usually not traveled much, or on a road visited for the first time.

Furthermore, according to the first embodiment, the similar traveling data extractor 7 extracts traveling data belonging to each category from the traveling data storage 3 in descending order of similarity to the category of the current traveling data acquired by the information acquiring unit 1, and, when the number of pieces of the traveling data extracted by the traveling data extractor 4 is less than the first number, the traveling data selector 5 selects, among the categories extracted by the similar traveling data extractor, traveling data of a category which has the highest similarity and to which the traveling data whose number of pieces is not less than the first number belongs. This can enhance credibility of measurement of driving characteristics by enabling utilization of a road situation that is most similar to the current road situation and past traveling data having a large number of times of traveling for measurement of the driving characteristic.

Second Embodiment

A driving characteristic measurement apparatus according to a second embodiment uses both traveling data of past traveling data in the same road situation as the current road situation and past traveling data in a road situation similar to the current road situation and thereby measures driving characteristics in the current driving.

Since a configuration of the driving characteristic measurement apparatus according to the second embodiment is the same in the drawing as the configuration of the driving characteristic measurement apparatus 1A according to the first embodiment illustrated in FIG. 1, in the following FIG. 1 is referred to.

Figure 4A:
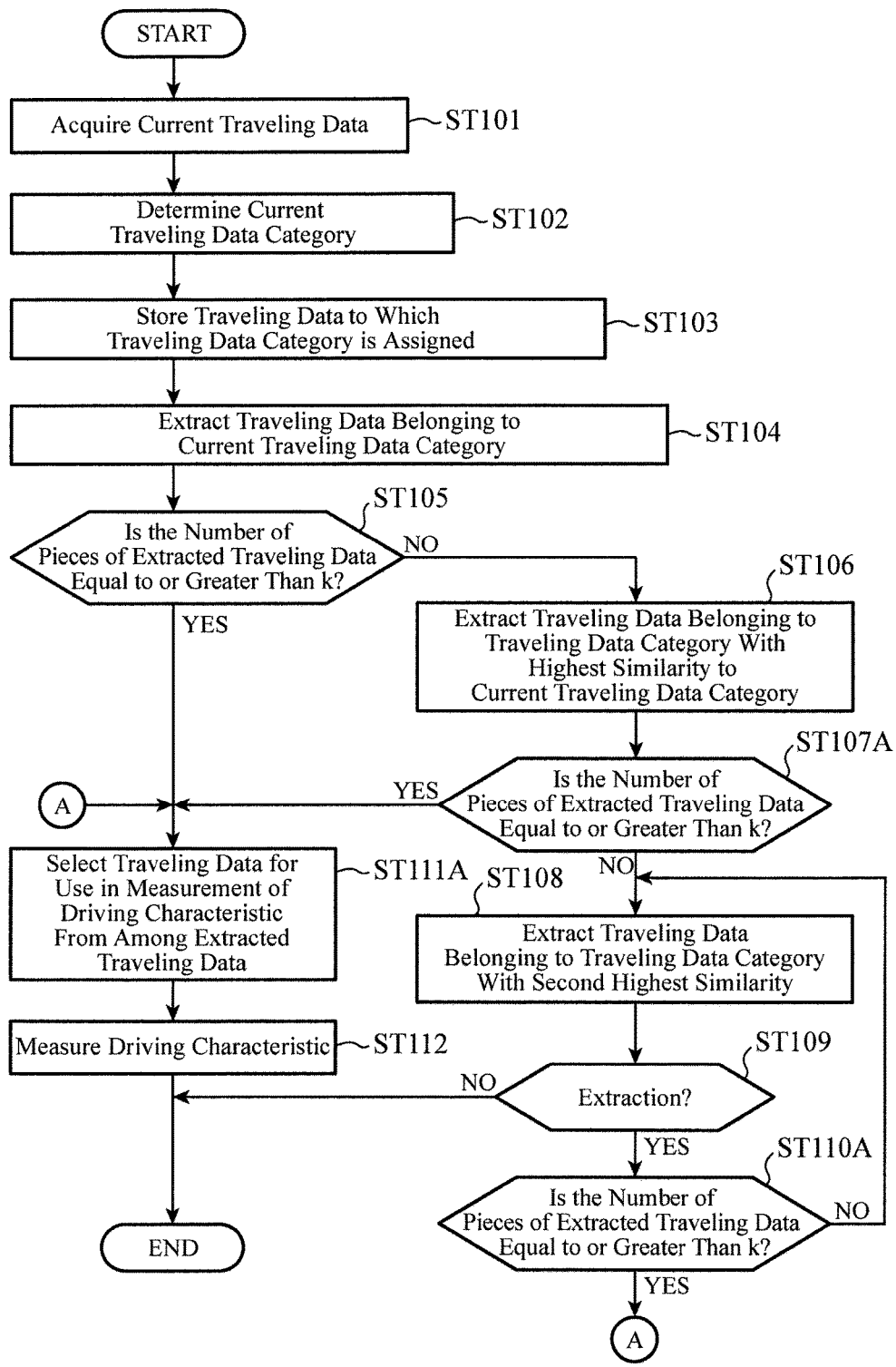
FIG. 4A is a flowchart illustrating exemplary operations of the driving characteristic measurement apparatus according to a second embodiment.

FIG. 4A is a flowchart illustrating exemplary operations of the driving characteristic measurement apparatus according to the second embodiment. Operations to be performed by a driving characteristic measurement apparatus 1A according to the second embodiment are different only in the operations of steps ST107, ST110 and ST111 among the operations illustrated in the flowchart of FIG. 2, and the operations of the other steps are the same as those in the first embodiment. Descriptions of operations similar to those in the first embodiment are omitted.

In the second embodiment, when the number of pieces of traveling data belonging to a traveling data category A in the current traveling road situation is less than k ("NO" in step ST105), a traveling data selector 5 selects not only the traveling data of less than k pieces belonging to the traveling data category A but also traveling data belonging to a traveling data category similar to the traveling data category A extracted in steps ST106 to ST110A are also selected for measurement of a driving characteristic as will be described later.

In step ST111A illustrated in FIG. 4A, the traveling data selector 5 selects a total of k or more pieces of traveling data obtained by adding the traveling data extracted in step ST105 by the traveling data extractor 4 and the traveling data extracted in step ST106 by the similar traveling data extractor 7. For example, if the number of pieces of traveling data belonging to the traveling data category A extracted by the traveling data extractor 4 in step ST105 is five, and the number of pieces of traveling data belonging to the traveling data category B extracted by the similar traveling data extractor 7 in step ST106 is 60, the traveling data selector 5 selects a total of 65 pieces of traveling data.

In step ST112, the driving characteristic measurement unit 6 measures driving characteristics using the traveling data selected in step ST111A. For example, if the traveling data selector 5 has selected traveling data belonging to the traveling data category A and the traveling data category B in step ST111A, the driving characteristic measurement unit 6 measures driving characteristics in the current travel classified as the traveling data category A by using the traveling data belonging to the traveling data category A and the traveling data category B.

If the number of pieces of traveling data belonging to the traveling data category B is less than k ("NO" in step ST107A), traveling data is selected as follows.

In step ST111A, the traveling data selector 5 selects a total of k or more pieces of traveling data obtained by adding the traveling data extracted in step ST105 by the traveling data extractor 4 and the traveling data extracted in step ST108 by the similar traveling data extractor 7. For example, if the number of pieces of traveling data belonging to the traveling data category A extracted by the traveling data selector 5 in step ST105 is five, and the number of pieces of traveling data belonging to the traveling data category C extracted by the similar traveling data extractor 7 in step ST108 is 70, the traveling data selector 5 selects a total of 75 pieces of traveling data.

In step ST112, the driving characteristic measurement unit 6 measures driving characteristics using the traveling data selected in step ST111A. For example, if the traveling data selector 5 has selected traveling data belonging to the traveling data category A and the traveling data category C in step ST111A, the driving characteristic measurement unit 6 measures driving characteristics in the current travel classified as traveling data category A by using the traveling data belonging to the traveling data category A and the traveling data category C.

As described above, according to the second embodiment, when the number of pieces of the traveling data extracted by the traveling data extractor 4 is less than the first number, the traveling data selector 5 selects the traveling data extracted by the traveling data extractor 4 in addition to the traveling data extracted by the similar traveling data extractor 7. By using the past traveling data in the current road situation for measurement of a driving characteristic in addition to the past traveling data in a road situation similar to the current road situation used for the measurement of the driving characteristic in the first embodiment, credibility can be enhanced as compared with the measurement result of the driving characteristic of the first embodiment.

Third Embodiment

A driving characteristic measurement apparatus according to a third embodiment evaluates past traveling data in the same road situation as the current road situation and past traveling data in a road situation similar to the current road situation and preferentially uses traveling data with higher evaluation for measurement of driving characteristics in the current driving.

Figure 5:
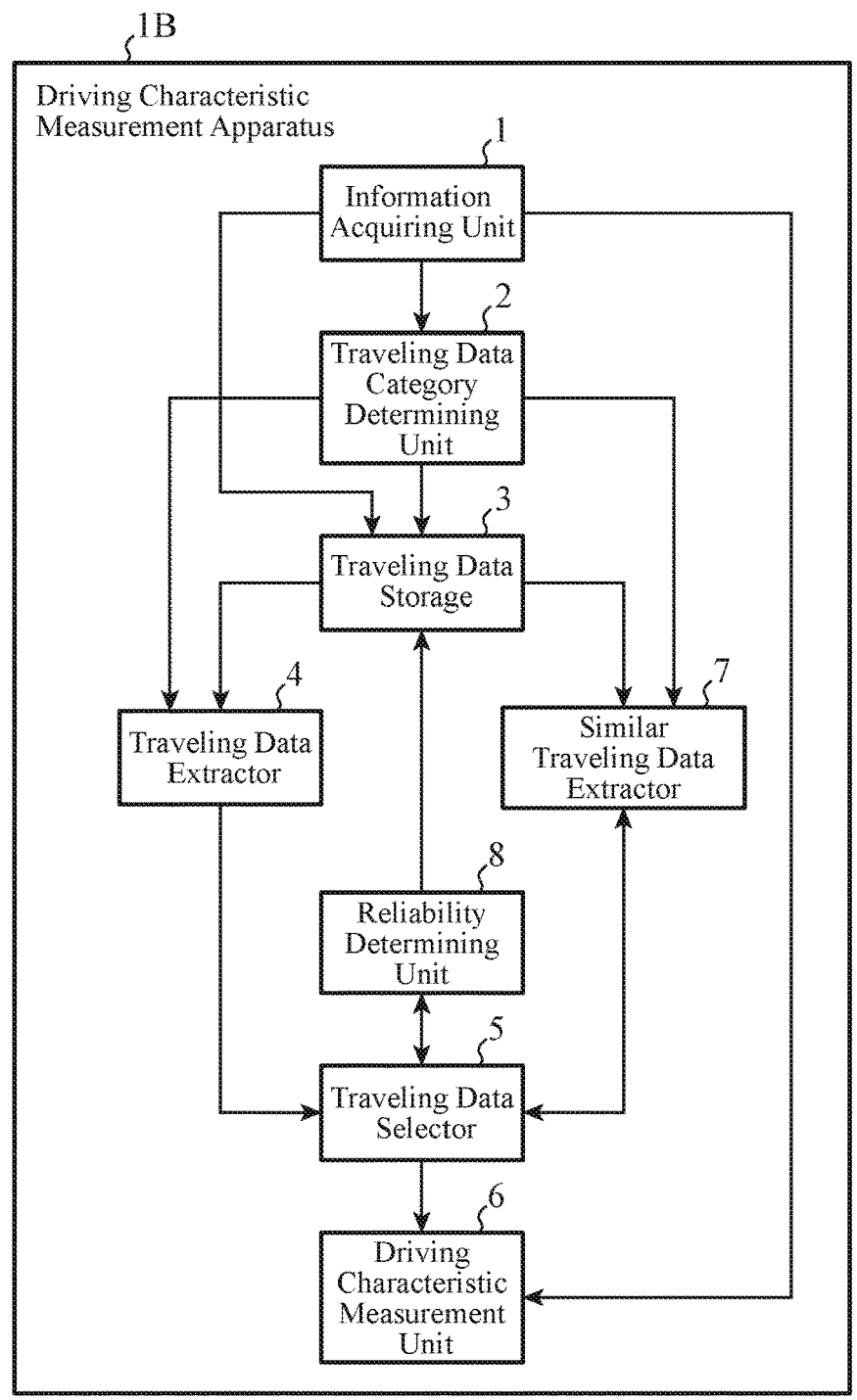
FIG. 5 is a block diagram illustrating an exemplary configuration of a driving characteristic measurement apparatus according to a third embodiment of the invention.

FIG. 5 is a block diagram illustrating a configuration of a driving characteristic measurement apparatus 1B according to the third embodiment for carrying out the invention.

The driving characteristic measurement apparatus 1B according to the third embodiment as illustrated in FIG. 5 has a configuration in which a reliability determining unit 8 is added to the configuration of the driving characteristic measurement apparatus 1A according to the first embodiment illustrated in FIG. 1. A function of the reliability determining unit 8 is implemented by the processor circuit 101 illustrated in FIG. 17A or the processor 104 illustrated in FIG. 17B.

Figure 6:
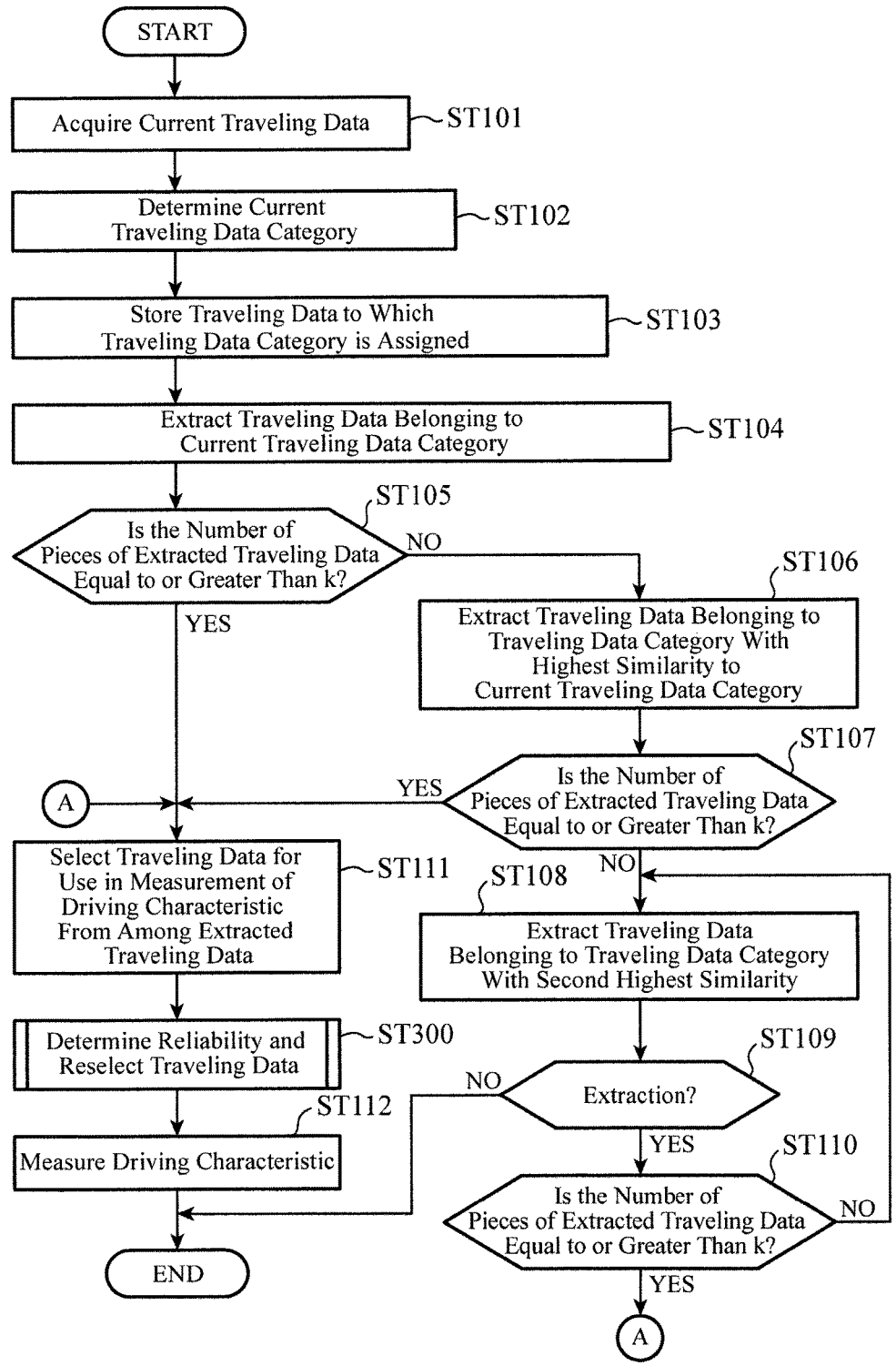
FIG. 6 is a flowchart illustrating exemplary operations of the driving characteristic measurement apparatus according to the third embodiment.

FIG. 6 is a flowchart illustrating operations in the third embodiment for carrying out the present invention. FIG. 6 is a diagram in which step ST300 is added to the flowchart of FIG. 2 illustrated in the first embodiment. Descriptions of operations similar to those in the first embodiment are omitted.

In step ST300, a reliability determining unit 8 determines a reliability of each piece of traveling data selected for measuring driving characteristics, and excludes traveling data with a low reliability, thereby reselecting traveling data for use in measurement of driving characteristics.

In step ST112, a driving characteristic measurement unit 6 measures driving characteristics using traveling data reselected in step ST300 and having a high reliability.

Figure 7:
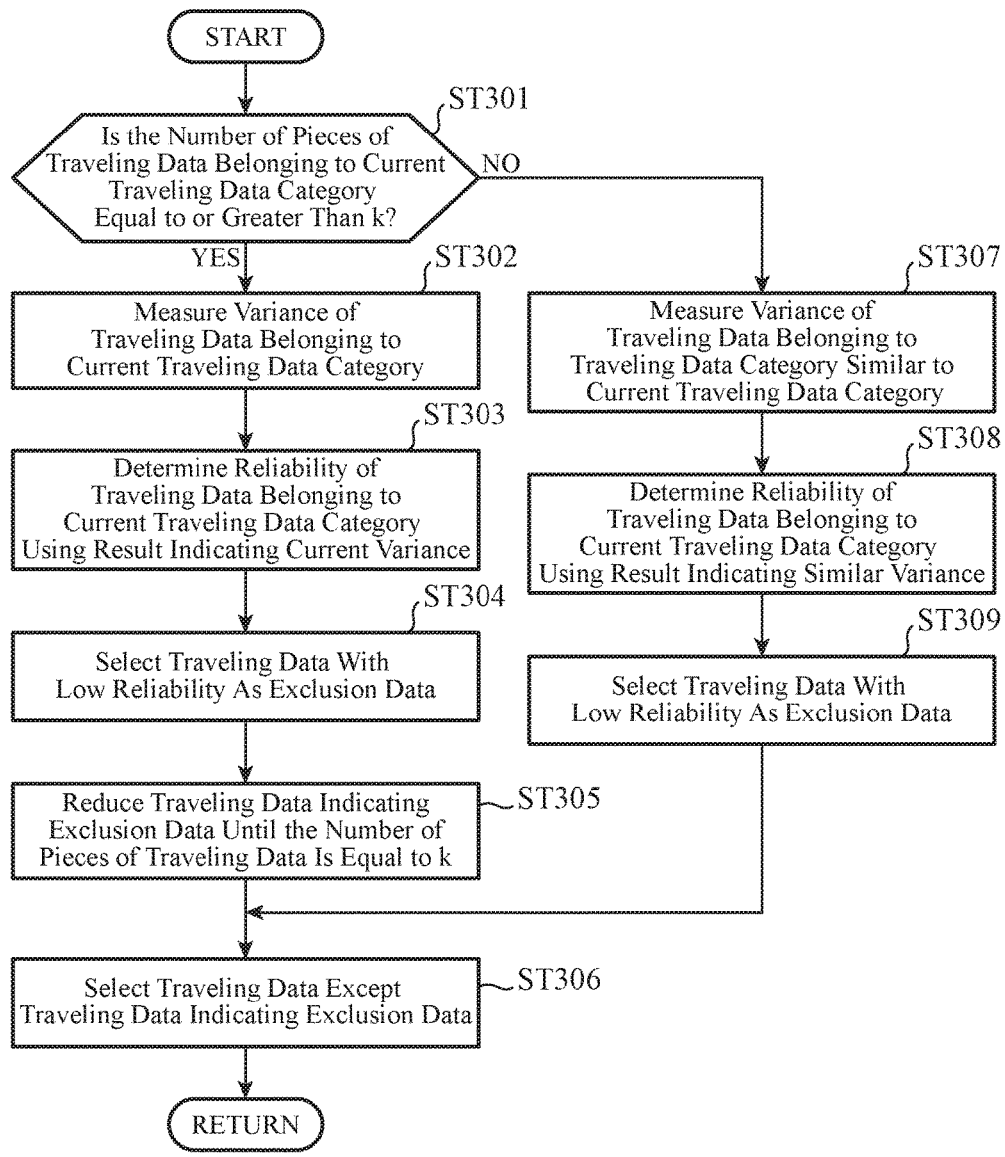
FIG. 7 is a flowchart illustrating detailed exemplary operations in step ST300 of FIG. 6.

FIG. 7 is a flowchart illustrating details of the operation of step ST300.

In step ST301, if the number of pieces of traveling data belonging to the current traveling data category selected in step ST111 is equal to or greater than k ("YES" in step ST301), the reliability determining unit 8 performs an operation of step ST302. For example, if the number of pieces of traveling data belonging to the traveling data category A is 60, the reliability determining unit 8 performs an operation of step ST302.

In step ST302, the reliability determining unit 8 calculates the variance of traveling data belonging to the current traveling data category selected in step ST111. The reliability determining unit 8 calculates the variance of traveling data belonging to the traveling data category A, for example. The variance calculated from traveling data belonging to the current traveling data category is referred to as the result indicating the current variance.

In step ST303, the reliability determining unit 8 determines a reliability for each piece of traveling data belonging to the current traveling data category selected in step ST111 by identifying, as an index, a reliability using the result indicating the current variance. The reliability determining unit 8 determines a reliability for each of 60 pieces of traveling data belonging to the traveling data category A, for example.

The reliability is an index to be set on the basis of the result indicating the current variance calculated in step ST302 such that the reliability becomes higher as traveling data approaches an average value and that the reliability becomes lower as traveling data becomes separated from the average value.

In step ST304, the reliability determining unit 8 selects, as exclusion data, traveling data having the reliability that is determined to be less than or equal to a threshold value in step ST303, from among the traveling data belonging to the current traveling data category. The reliability determining unit 8 determines that reliabilities of twelve pieces of traveling data among the 60 pieces of traveling data belonging to the traveling data category A is less than or equal to the threshold value, for example. In the present embodiment, the traveling data of which a reliability is less than or equal to the threshold value is greatly deviated from an average value and has a low reliability, so it is not possible to measure driving characteristics with high credibility. Note that the threshold value for a reliability may be determined in advance or may be changed in accordance with the result indicating a variance during operations of the present driving characteristic measurement apparatus.

In step ST305, the traveling data storage 3 reduces the traveling data indicating exclusion data in ascending order of reliability until the value, obtained by subtracting the number of pieces of traveling data selected as exclusion data in step ST304 from the number of pieces of traveling data belonging to the current traveling data category selected in step ST111, is equal to k. When the number of pieces of traveling data belonging to the traveling data category A is 60 and the number of pieces of the traveling data indicating exclusion data is twelve, the reliability determining unit 8 excludes ten pieces of traveling data in ascending order of reliability, for example.

In step ST306, the traveling data selector 5 selects k or more pieces of traveling data except the traveling data excluded in step ST305. For example, when the number of pieces of traveling data belonging to the traveling data category A is 60 and the number of pieces of traveling data indicating exclusion data is four, since the four pieces of traveling data are excluded, the traveling data selector 5 selects the 56 pieces of traveling data belonging to the traveling data category A.

In step ST112, the driving characteristic measurement unit 6 measures driving characteristics using the traveling data selected in step ST306.

In step ST301, if the number of pieces of traveling data belonging to the current traveling data category selected in step ST111 is less than k ("NO" in step ST301), the reliability determining unit 8 performs an operation of step ST307. For example, if the number of pieces of traveling data belonging to the traveling data category A is 5, the reliability determining unit 8 performs an operation of step ST307.

In step ST307, the reliability determining unit 8 calculates a variance of the traveling data belonging to a traveling data category similar to the current traveling data category selected in step ST111. For example, the reliability determining unit 8 calculates a variance of traveling data belonging to the traveling data category B. The variance calculated from traveling data belonging to a traveling data category similar to the current traveling data category is called the result indicating a similar variance.

In step ST308, the reliability determining unit 8 determines a reliability for each piece of traveling data belonging to the current traveling data category selected in step ST111 using the result of a similar variance. The reliability determining unit 8 determines a reliability of each of five pieces of traveling data belonging to the traveling data category A using the result indicating a variance of the traveling data category B, for example.

The reliability is an index to be set on the basis of the result indicating a similar variance calculated in step ST307 such that the reliability becomes higher as traveling data approaches the average value and that the reliability becomes lower as traveling data becomes separated from the average value.

In step ST309, the reliability determining unit 8 selects, as exclusion data, traveling data that is determined to have a reliability being less than or equal to a threshold value in step ST308, from among the traveling data belonging to the current traveling data category. The reliability determining unit 8 determines that reliabilities of two pieces of traveling data among the five pieces of traveling data belonging to the traveling data category A is less than or equal to the threshold value, for example.

In step ST306, the traveling data selector 5 selects k or more pieces of traveling data except the traveling data selected as exclusion data in step ST309. For example, if there are five pieces of traveling data belonging to the traveling data category A while two pieces of traveling data are selected as exclusion data from among the traveling data belonging to the traveling data category A, and there are 60 pieces of traveling data belonging to the traveling data category B, the traveling data selector 5 selects a total of 63 pieces of traveling data obtained by adding the three pieces of traveling data belonging to the traveling data category A and the 60 pieces of traveling data belonging to the traveling data category B.

Figure 8:
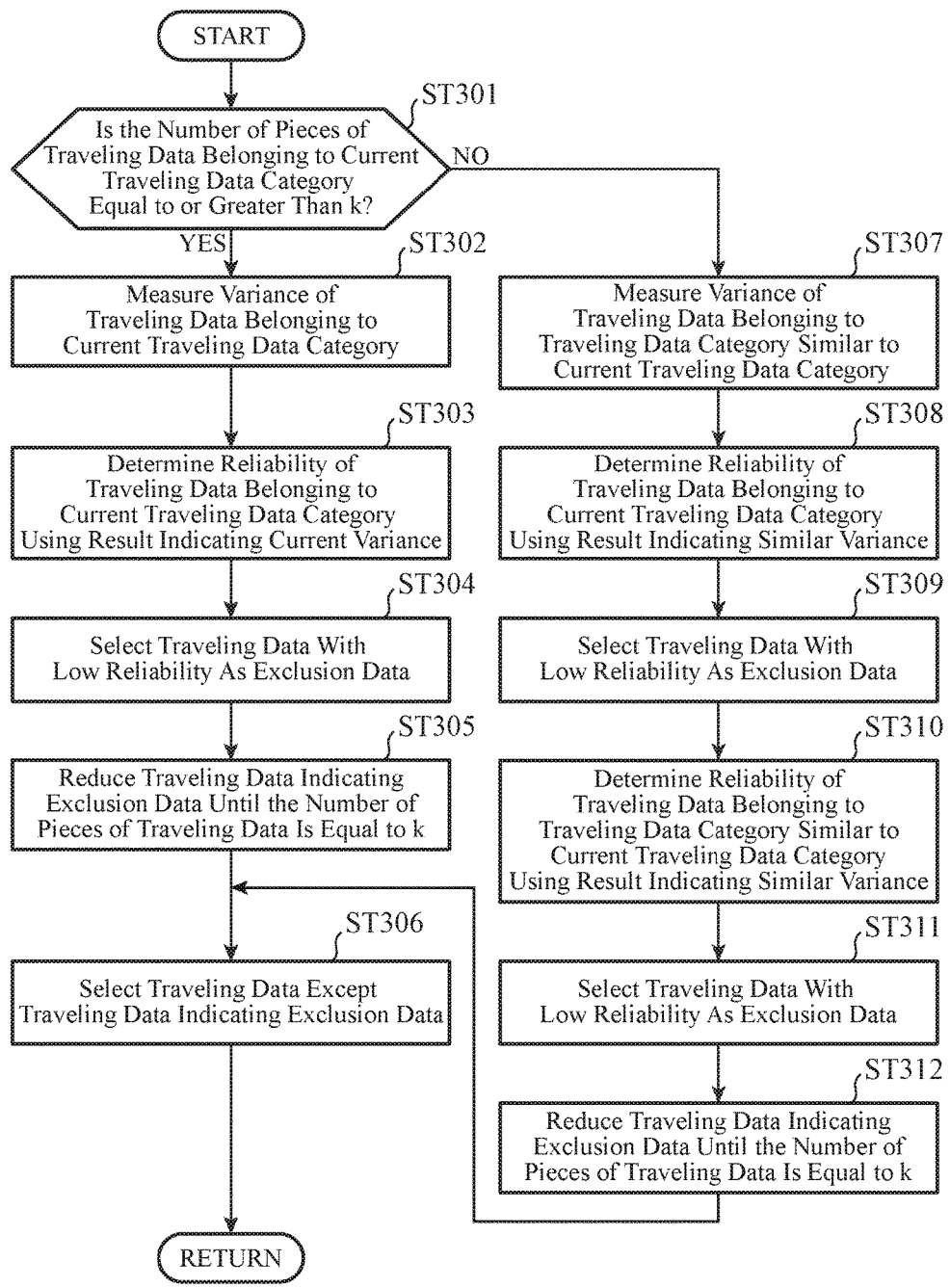
FIG. 8 is a flowchart illustrating detailed exemplary operations in step ST300 of FIG. 6.

In FIG. 7, although the reliability of the traveling data belonging to the traveling data category similar to the current traveling data category is not determined, the reliability may be determined. A flowchart in this case is illustrated in FIG. 8. Note that since operations of steps ST301 to ST309 in FIG. 8 are the same operations as those in FIG. 7, their descriptions are omitted.

In step ST310, the reliability determining unit 8 determines a reliability for each piece of traveling data belonging to a traveling data category similar to the current traveling data category selected in step ST111 using the result indicating a similar variance calculated in step ST307. The reliability determining unit 8 determines a reliability of each of 60 pieces of traveling data belonging to the traveling data category B, for example.

In step ST311, the reliability determining unit 8 selects traveling data that is determined to have a reliability being less than or equal to a threshold value in step ST310, from among traveling data belonging to traveling data similar to the current traveling data category. The reliability determining unit 8 determines that reliabilities of eight pieces of traveling data among the 60 pieces of traveling data belonging to the traveling data category B is less than or equal to the threshold value, for example.

In step ST312, the reliability determining unit 8 reduces the traveling data indicating exclusion data in descending order of reliability until the value, obtained by subtracting the number of pieces of traveling data selected as exclusion data in step ST311 from the number of pieces of traveling data belonging to a traveling data category similar to the current traveling data category selected in step ST111, is equal to k. When the number of pieces of traveling data belonging to the traveling data category B is 60 and the number of pieces of the traveling data indicating exclusion data is eight, the reliability determining unit 8 excludes the eight pieces of traveling data, for example.

In step ST306, the traveling data selector 5 selects a total of k or more pieces of traveling data, including traveling data belonging to the current traveling data category except the traveling data selected as exclusion data in step ST309, and including traveling data belonging to the traveling data category similar to the current traveling data category except the traveling data excluded in step ST312. For example, if there are five pieces of traveling data belonging to the traveling data category A while two pieces of traveling data are selected as exclusion data from among the traveling data belonging to the traveling data category A, there are 60 pieces of traveling data belonging to the traveling data category B, and there are eight pieces of traveling data are excluded from the traveling data belonging to the traveling data category B, the traveling data selector 5 selects a total of 55 pieces of traveling data, including the three pieces of traveling data belonging to the traveling data category A and 52 pieces of the traveling data belonging to the traveling data category B.

Note that in the above descriptions as the traveling data category similar to the current traveling data category selected in step ST111, an example of using k or more pieces of traveling data belonging to the traveling data category B extracted in step ST106 has been described; however, when the number of pieces of traveling data belonging to the traveling data category B is less than k, the traveling data category C extracted in step ST108 is used.

Moreover, in the above description, the reliability used for evaluation of traveling data is determined on the basis of the result indicating a variance of the traveling data; however, the reliability may be determined on the basis of another arithmetic result such as a standard deviation.

As described above, according to the third embodiment, the driving characteristic measurement apparatus 1B further includes the reliability determining unit 8 configured to determine a reliability of each piece of traveling data, and the traveling data selector 5 preferentially selects traveling data with a high reliability on the basis of the determination result of the reliability determining unit 8. By excluding traveling data with a low reliability from past traveling data in the current road situation used in the measurement of driving characteristics in the second embodiment, it is possible to enhance credibility of a measurement result of driving characteristics as compared to that of the second embodiment.

Fourth Embodiment

When the number of times of traveling in the past in the same road situation as the current road situation is small, and the number of times of traveling in the past in a similar road situation to the current road situation is also small, a driving characteristic measurement apparatus according to a fourth embodiment further uses traveling data in the past in a road situation having the second highest similarity for measurement of driving characteristics in the current driving.

Since a configuration of the driving characteristic measurement apparatus according to the fourth embodiment is the same in the drawing as the configuration of the driving characteristic measurement apparatus 1A according to the first embodiment illustrated in FIG. 1, in the following FIG. 1 is referred to.

Figure 9:
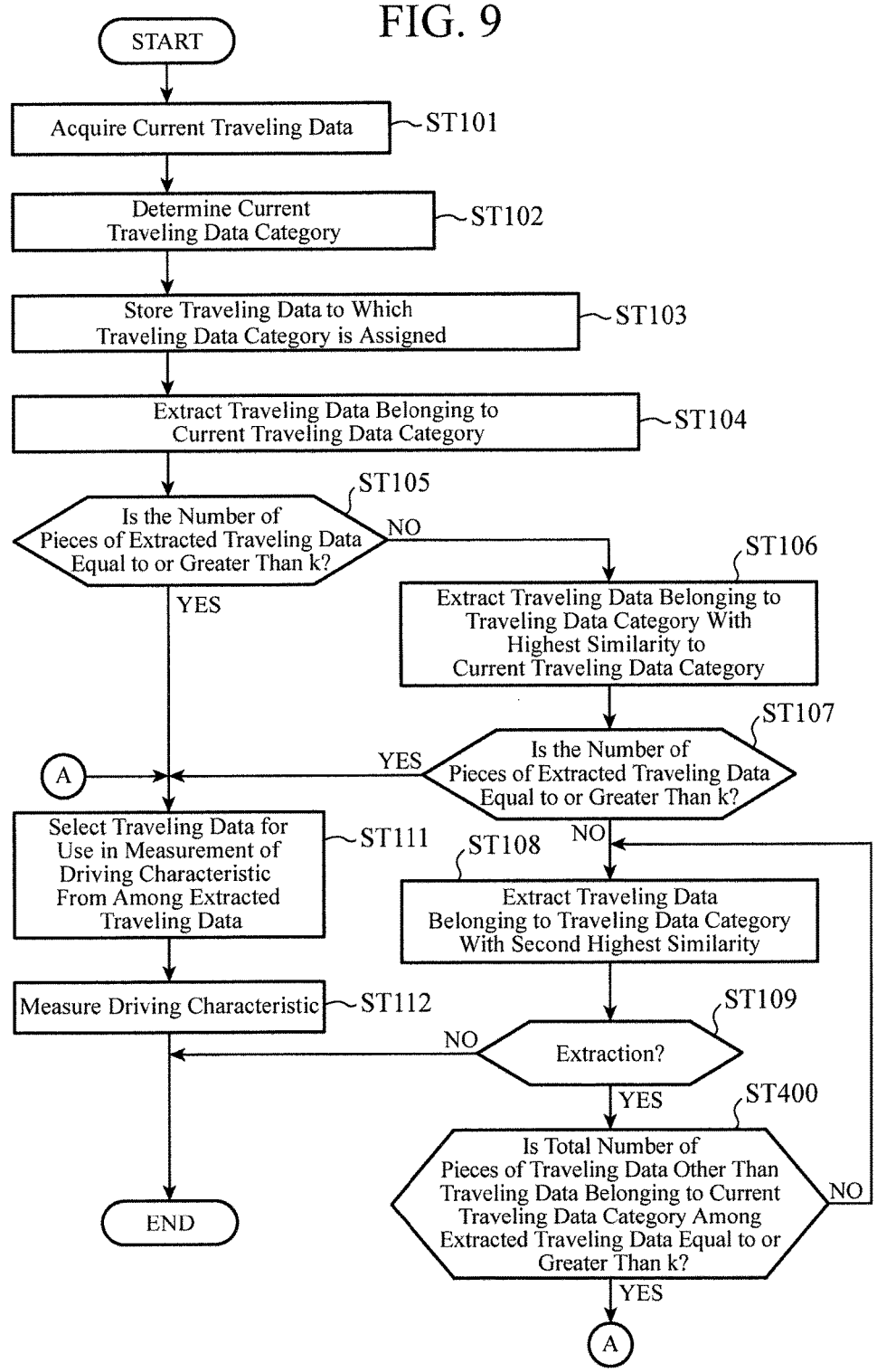
FIG. 9 is a flowchart illustrating exemplary operations of a driving characteristic measurement apparatus according to a fourth embodiment of the invention.

FIG. 9 is a flowchart illustrating operations in the third embodiment for carrying out the invention. In FIG. 9, step ST110 illustrated in FIG. 2 in the first embodiment is replaced with step ST400. Descriptions of operations similar to those in the first embodiment are omitted.

In step ST400, if the total of the number of pieces of traveling data extracted in step ST106 and the number of pieces of traveling data extracted in step ST108 is equal to or greater than k ("YES" in step ST400), the traveling data selector 5 performs an operation of step ST111. For example, if the number of pieces of traveling data belonging to the traveling data category B is thirty and the number of pieces of traveling data belonging to the traveling data category C is forty, resulting in a total of seventy, the traveling data selector 5 performs an operation of step ST111.

In step ST111, the traveling data selector 5 selects a total of k or more pieces of traveling data including the traveling data extracted in step ST106 and the traveling data extracted in step ST108. For example, if the number of pieces of traveling data belonging to the traveling data category B extracted in step ST106 is thirty and the number of pieces of traveling data belonging to the traveling data category C extracted in step ST108 is 40, the traveling data selector 5 selects a total of 70 pieces of traveling data.

In step ST112, the driving characteristic measurement unit 6 measures driving characteristics using the traveling data selected in step ST111. For example, if the traveling data selector 5 has selected traveling data belonging to the traveling data category B and the traveling data category C in step ST111, the driving characteristic measurement unit 6 measures driving characteristics in the current travel classified as traveling data category A by using the traveling data belonging to the traveling data category B and the traveling data category C.

In step ST400, if the total of the number of pieces of traveling data extracted in step ST106 and the number of pieces of traveling data extracted in step ST108 is less than k ("NO" in step ST400), the similar traveling data extractor 7 performs an operation of step ST108. For example, if the number of pieces of traveling data belonging to the traveling data category B is ten and the number of pieces of traveling data belonging to the traveling data category C is twenty, resulting in a total of thirty, the similar traveling data extractor 7 performs an operation of step ST108.

If a traveling data category cannot be extracted in step ST108 ("NO" in step ST109), the similar traveling data extractor 7 terminates processing. For example, if the traveling data category D cannot be extracted, the similar traveling data extractor 7 terminates processing.

Contrarily, if a traveling data category can be extracted in step ST108 ("YES" in step ST109), the similar traveling data extractor 7 performs an operation of step ST400. For example, if the traveling data category D is extracted, the similar traveling data extractor 7 performs an operation of step ST400.

In step ST400, if the total of the number of pieces of traveling data extracted in step ST106 and the number of pieces of traveling data extracted in step ST108 is equal to or greater than k ("YES" in step ST400), the traveling data selector 5 performs an operation of step ST111. For example, the traveling data selector 5 performs an operation of step ST111 if the number of pieces of traveling data belonging to the traveling data category B is ten, the number of pieces of traveling data belonging to the traveling data category C is twenty, and the number of pieces of traveling data belonging to the traveling data category D is thirty, resulting in a total of 60.

In step ST111, the traveling data selector 5 selects a total of k or more pieces of traveling data including the traveling data extracted in step ST106 and the traveling data extracted in step ST108. For example, the traveling data selector 5 selects a total of 60 pieces of traveling data if the number of pieces of traveling data belonging to the traveling data category B extracted in step ST106 is ten, the number of pieces of traveling data belonging to the traveling data category C extracted in step ST108 is twenty, and the number of pieces of traveling data belonging to the traveling data category D extracted in step ST108 is thirty.

In step ST112, the driving characteristic measurement unit 6 measures driving characteristics using the traveling data selected in step ST111. For example, if the traveling data selector 5 has selected traveling data belonging to the traveling data category B, the traveling data category C, and the traveling data category D in step ST111, the driving characteristic measurement unit 6 measures driving characteristics in the current travel classified as traveling data category A by using the traveling data belonging to the traveling data category B, the traveling data category C, and the traveling data category D.

As described above, according to the fourth embodiment, the similar traveling data extractor 7 extracts traveling data belonging to each category from the traveling data storage 3 in descending order of similarity to the category of the current traveling data acquired by the information acquiring unit 1, and, when the number of pieces of the traveling data extracted by the traveling data extractor 4 is less than the first number, the traveling data selector 5 selects, among the categories extracted by the similar traveling data extractor 7, traveling data whose number of pieces becomes equal to or greater than the first number when pieces of traveling data belonging to one or more categories having high similarity are summed up. By using traveling data of the plurality of types of road situations similar to the current road situation, it is possible to increase the number of pieces of traveling data used for measurement of the driving characteristics in the current traveling and to enhance credibility of a measurement result of driving characteristics.

Fifth Embodiment

A driving characteristic measurement apparatus according to a fifth embodiment extracts a difference between the current road situation and a road situation similar to the current road situation and corrects driving characteristics to thereby reduce influence of the difference.

Figure 10:
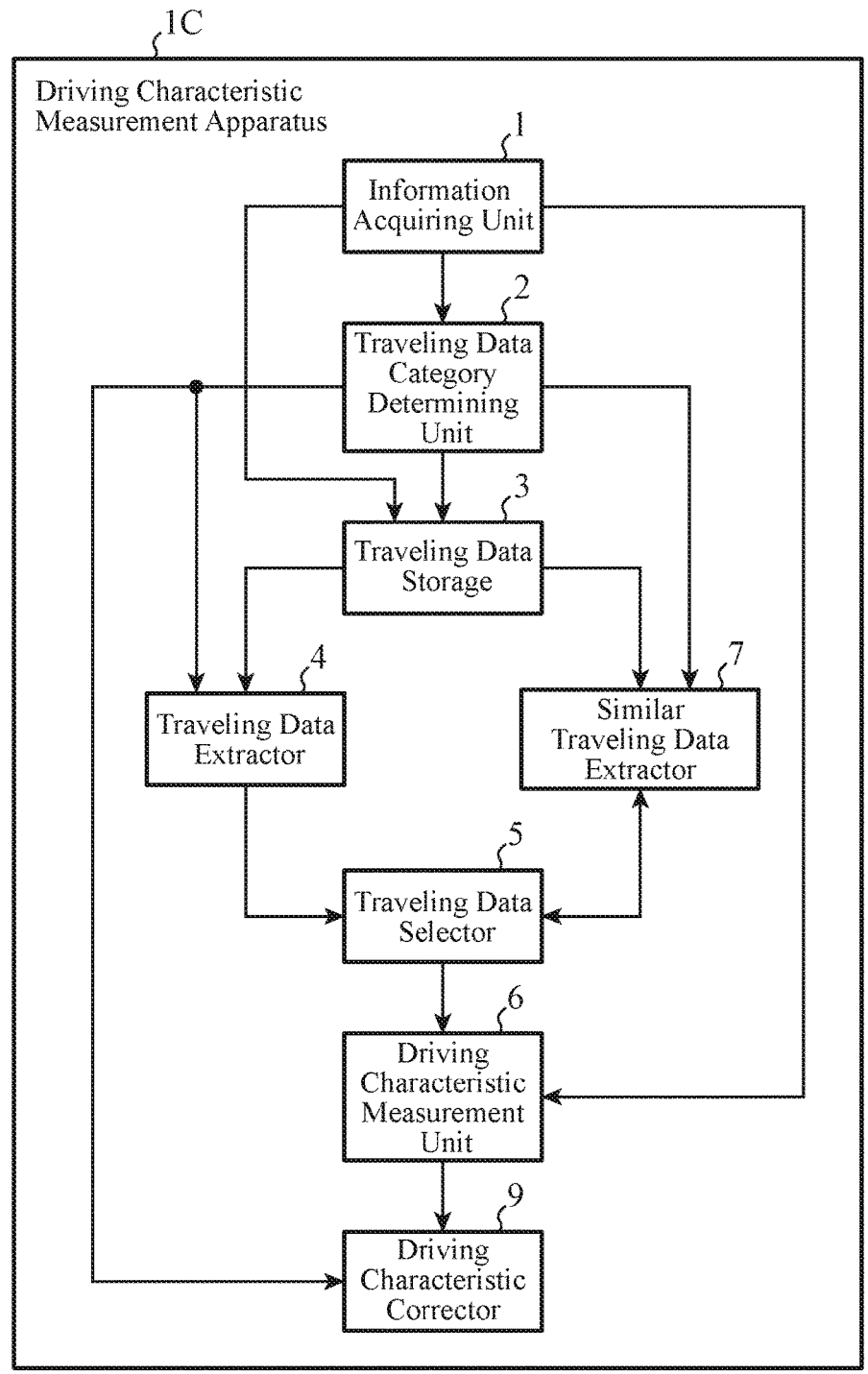
FIG. 10 is a block diagram illustrating an exemplary configuration of a driving characteristic measurement apparatus according to a fifth embodiment of the invention.

FIG. 10 is a block diagram illustrating a configuration of a driving characteristic measurement apparatus 1C according to the fifth embodiment for carrying out the invention.

The driving characteristic measurement apparatus 1C according to the fifth embodiment illustrated in FIG. 10 has a configuration in which a driving characteristic corrector 9 is added to the configuration of the driving characteristic measurement apparatus 1A according to the first embodiment illustrated in FIG. 1. The function of the driving characteristic corrector 9 is implemented by the processor circuit 101 illustrated in FIG. 17A or the processor 104 illustrated in FIG. 17B.

Figure 11:
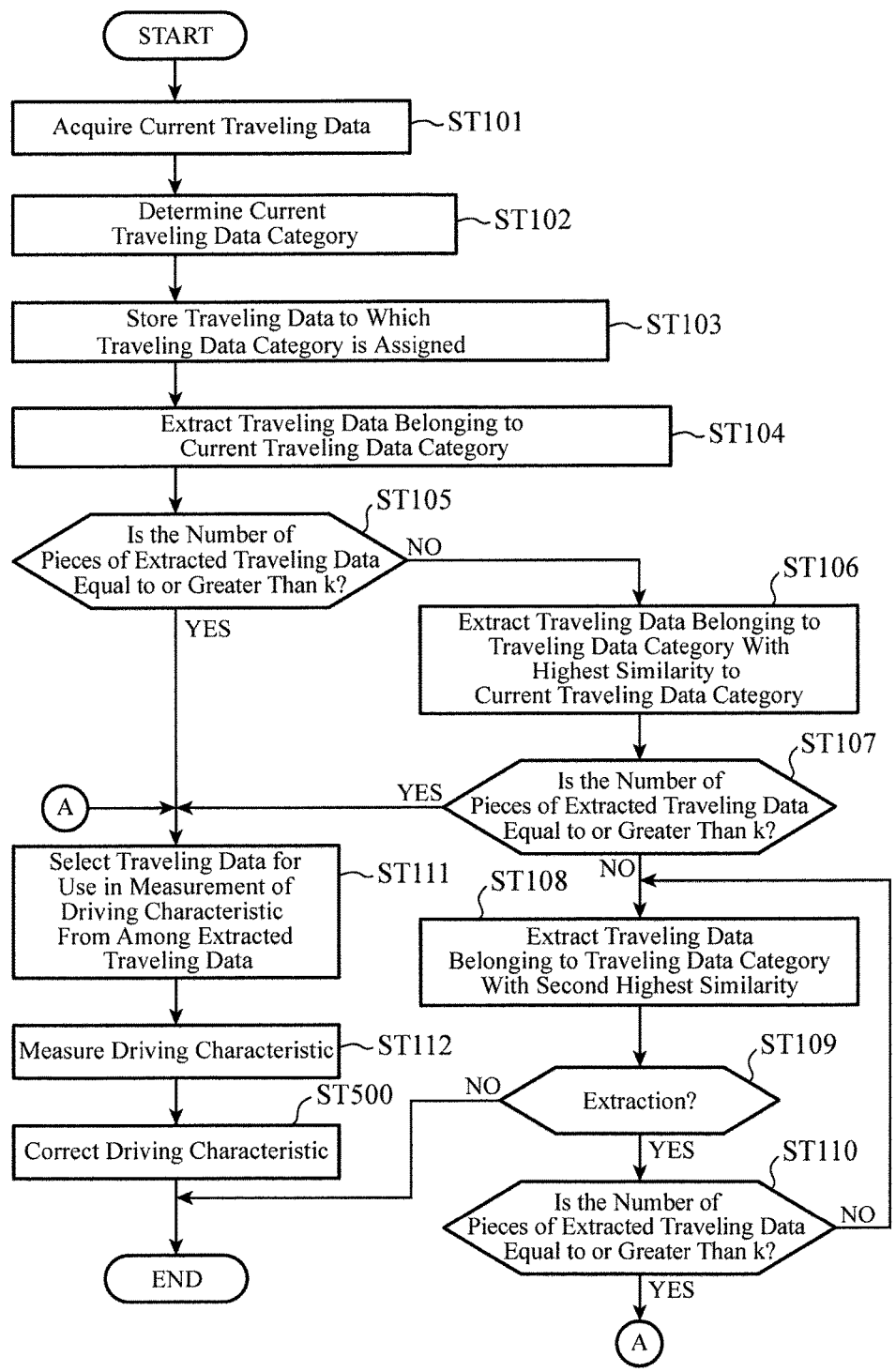
FIG. 11 is a flowchart illustrating exemplary operations of the driving characteristic measurement apparatus according to the fifth embodiment.

FIG. 11 is a flowchart illustrating operations in the fifth embodiment for carrying out the present invention. FIG. 11 is a diagram in which step ST500 is added to the flowchart of FIG. 2 illustrated in the first embodiment. Descriptions of operations similar to those in the first embodiment are omitted.

In step ST500, the driving characteristic corrector 9 corrects a measurement result of a driving characteristic measurement unit 6 on the basis of a difference between the current traveling data category A determined by the traveling data category determining unit 2 and a traveling data category used by the driving characteristic measurement unit 6.

In the present embodiment, it is assumed that, in both the traveling data category A and the traveling data category B, roads that have the same road shape and different speed limits are set. The traveling data category A is a road with a speed limit of 50 km/h, and the traveling data category B is a road with a speed limit of 60 km/h.

Regarding a method of correction, for example, traveling on a road of the traveling data category B at 55 km/h is not regarded as rough driving, but traveling on a road of the traveling data category A at 55 km/h should be regarded as rough driving. However, when driving characteristics of the traveling data category A are measured using traveling data belonging to the traveling data category B, even traveling at 55 km/h is not regarded as rough driving, which is inappropriate as driving characteristics of the traveling data category A.

Therefore, for example, the driving characteristic corrector 9 corrects the measurement result of the driving characteristics to match the traveling data category A by, for example, biasing the measurement result of driving characteristics in the traveling data category B in a stricter side. In the above example, the driving characteristic corrector 9 corrects the vehicle speed to a higher side as correction of the driving characteristics of the traveling data category B. For example, when a road of the traveling data category A is traveled at 55 km/h, correction of adding 10 km/h is performed to obtain the driving characteristics of traveling at 65 km/h. By doing so, even in a case of currently traveling at 55 km/h on a road of the traveling data category A (speed limit of 50 km/h) driving characteristics of which are measured using traveling data of the traveling data category B (speed limit of 60 km/h), this can be regarded as rough driving at 65 km/h, thereby allowing the driving characteristics to be suitable for the traveling data category A.

Note that the information on the speed limit is obtained by the information acquiring unit 1 by acquiring a captured image of a sign from an onboard camera and recognizing the speed limit described in the sign or by acquiring map information from a navigation device and extracting a speed limit.

In the present embodiment, the example of the speed limit has been described as a difference of traveling data categories, but a difference to be corrected is not limited to speed limit information. A correction method may be determined in advance for each type of difference to be corrected.

For example, it is assumed that, in both the traveling data category A and the traveling data category B, roads are set in a manner that has the same road shape and the only one different point in the roads as to whether other vehicles exist around the host vehicle. The traveling data category A is a road on which there is another vehicle, and the traveling data category B is a road on which there is no other vehicle.

Regarding the correction method, for example, even when a blinker is used immediately before a point of turning right of the traveling data category B, since there are no other vehicles, it is not regarded as rough driving, but if the blinker is used immediately before a point of turning right of the traveling data category A, it should be regarded as rough driving. However, when driving characteristics of the traveling data category A are measured using traveling data belonging to the traveling data category B, even a delayed timing of using the blinker is not regarded as rough driving, which is inappropriate as driving characteristics of the traveling data category A.

Therefore, the driving characteristic corrector 9 corrects the timing of using the blinker to a slower side, that is, corrects a point of using the blinker to a point closer to the point of turning right as correction of the driving characteristics of the traveling data category B. For example, in a case of turning on the blinker at 30 meters ahead the point of turning right of the traveling data category A, correction of subtracting 10 meters is performed to implement the driving characteristics of turning on the blinker 20 meters ahead. By doing so, even in a case of turning on the blinker 30 meters ahead of the point of turning right in the traveling data category A (road with other vehicles) driving characteristics of which are measured using traveling data of the traveling data category B (road without other vehicles), this can be regarded as rough driving with turning on the blinker 20 meters ahead, thereby allowing the driving characteristics to be suitable for the traveling data category A.

Note that the information of a timing of turning on the blinker is acquired by the information acquiring unit 1 by acquiring map information from a navigation device and extracting the point of turning right or by other means.

As described above, according to the fifth embodiment, the driving characteristic measurement apparatus 1C includes the driving characteristic corrector 9 configured to, when the driving characteristic measurement unit 6 measures the driving characteristic on the currently traveling road using the traveling data extracted by the similar traveling data extractor 7, extract a difference between a situation of a road indicated by the traveling data extracted by the similar traveling data extractor 7 and a situation of the road currently traveled on, and configured to correct the driving characteristic to thereby reduce influence of the extracted difference. By correcting the measurement result of the driving characteristics such that the influence of the difference is reduced, when there is a difference between the current road situation and a road situation used for measurement of the driving characteristics, it is possible to obtain driving characteristics optimal for the current road situation.

Sixth Embodiment

A driving characteristic measurement apparatus according to a sixth embodiment prohibits measurement of driving characteristics when the number of times of traveling in the past does not reach a predetermined number required at least for measurement of driving characteristics in all the road situations similar to the current road situation.

Since a configuration of the driving characteristic measurement apparatus according to the sixth embodiment is the same in the drawing as the configuration of the driving characteristic measurement apparatus 1A according to the first embodiment illustrated in FIG. 1, in the following FIG. 1 is referred to.

In the driving characteristic measurement apparatus 1A of the sixth embodiment, a predetermined number of pieces of traveling data required at least for measurement of driving characteristic is n (n<k). When the total number of pieces of traveling data extracted by the similar traveling data extractor 7 is less than n, measurement of driving characteristics using the traveling data is prohibited. In the driving characteristic measurement apparatus 1A of the first embodiment, it is assumed that k or more pieces of traveling data are defined as the number of pieces of traveling data that allow measurement of appropriate driving characteristics; however in the sixth embodiment, when there are at least n or more pieces of traveling data, driving characteristic may be measured even though credibility is somewhat lower than a measurement result obtained using k pieces of traveling data.

In the present embodiment, descriptions will be given assuming that k, where k=50, is a "first number" and n, where n=30, is a "second number".

Figure 12:
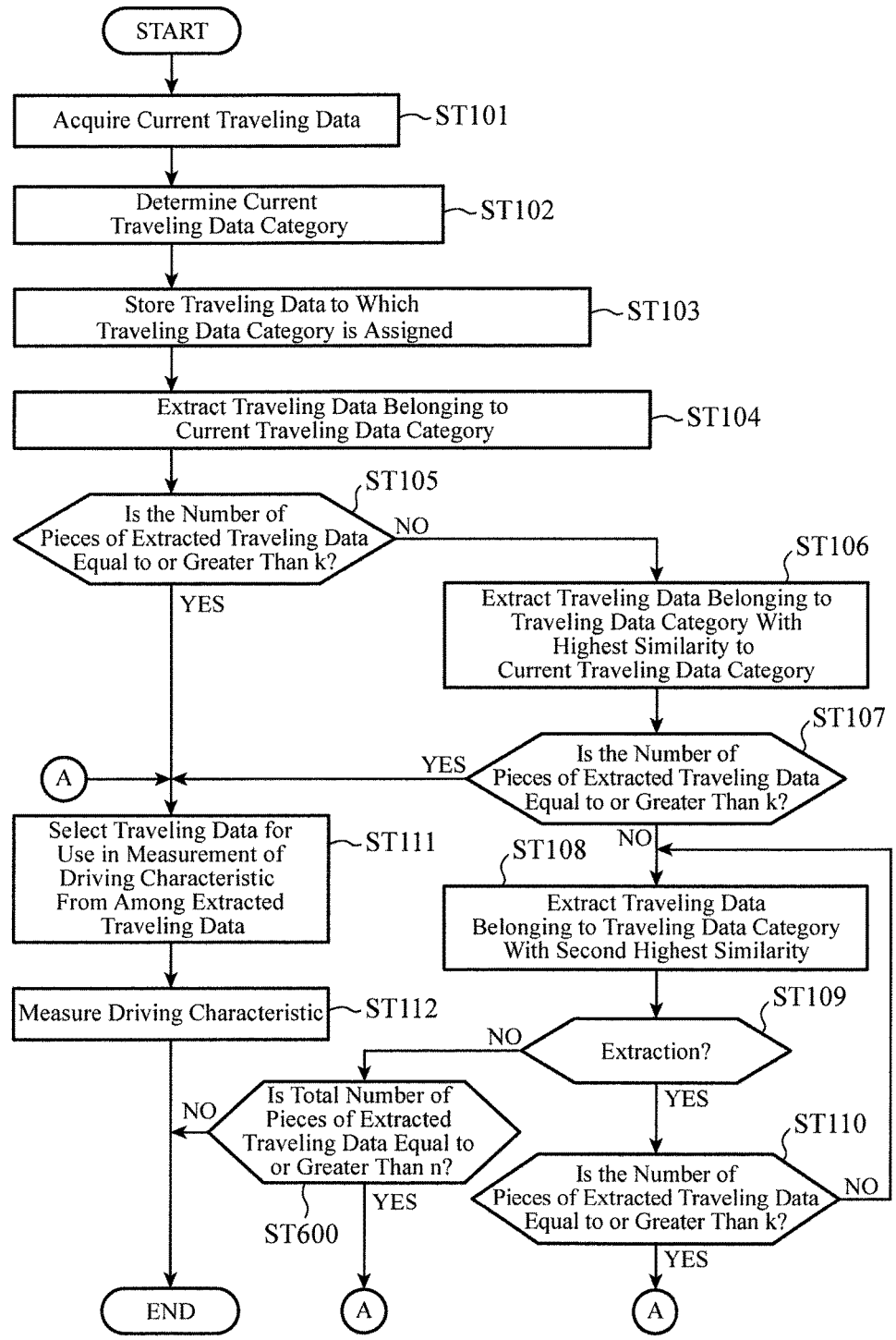
FIG. 12 is a flowchart illustrating exemplary operations of a driving characteristic measurement apparatus according to a sixth embodiment of the invention.

FIG. 12 is a flowchart illustrating operations in the sixth embodiment for carrying out the present invention. FIG. 12 is a diagram in which step ST600 is added to the flowchart of FIG. 2 illustrated in the first embodiment. Descriptions of operations similar to those in the first embodiment are omitted.

In step ST600, if the total of the number of pieces of traveling data obtained by adding the number of pieces of traveling data extracted in step ST106 and the number of pieces of traveling data extracted in step ST108 is less than n ("NO" in step ST600), the traveling data selector 5 terminates processing.

On the other hand, in step ST600, when the total number of pieces of traveling data obtained by adding the number of pieces of traveling data extracted in step ST106 and the number of pieces of traveling data extracted in step ST108 is equal to or greater than n ("YES" in step ST600), the traveling data selector 5 performs an operation of step ST111.

In step ST111, the traveling data selector 5 selects a total of n or more pieces of traveling data obtained by adding the traveling data extracted in step ST106 and the traveling data extracted in step ST108.

As described above, according to the sixth embodiment, when the number of pieces of the traveling data extracted by the traveling data extractor 4 is less than the first number, and the number of pieces of traveling data extracted by the similar traveling data extractor 7 is equal to or greater than the predetermined second number smaller than the first number, the traveling data selector 5 selects the traveling data, and, when the number of pieces of the traveling data extracted by the similar traveling data extractor 7 is less than the second number, does not select the traveling data and prohibits measurement of a driving characteristic. By setting the number n of pieces of traveling data at least required for measurement of driving characteristics and prohibiting measurement of driving characteristics when the number of pieces of traveling data used for measurement of the driving characteristics is less than n, measurement of driving characteristics with low credibility can be prevented.

Seventh Embodiment

A driving characteristic measurement apparatus according to a seventh embodiment measures a driving characteristic for each driver.

Figure 13:
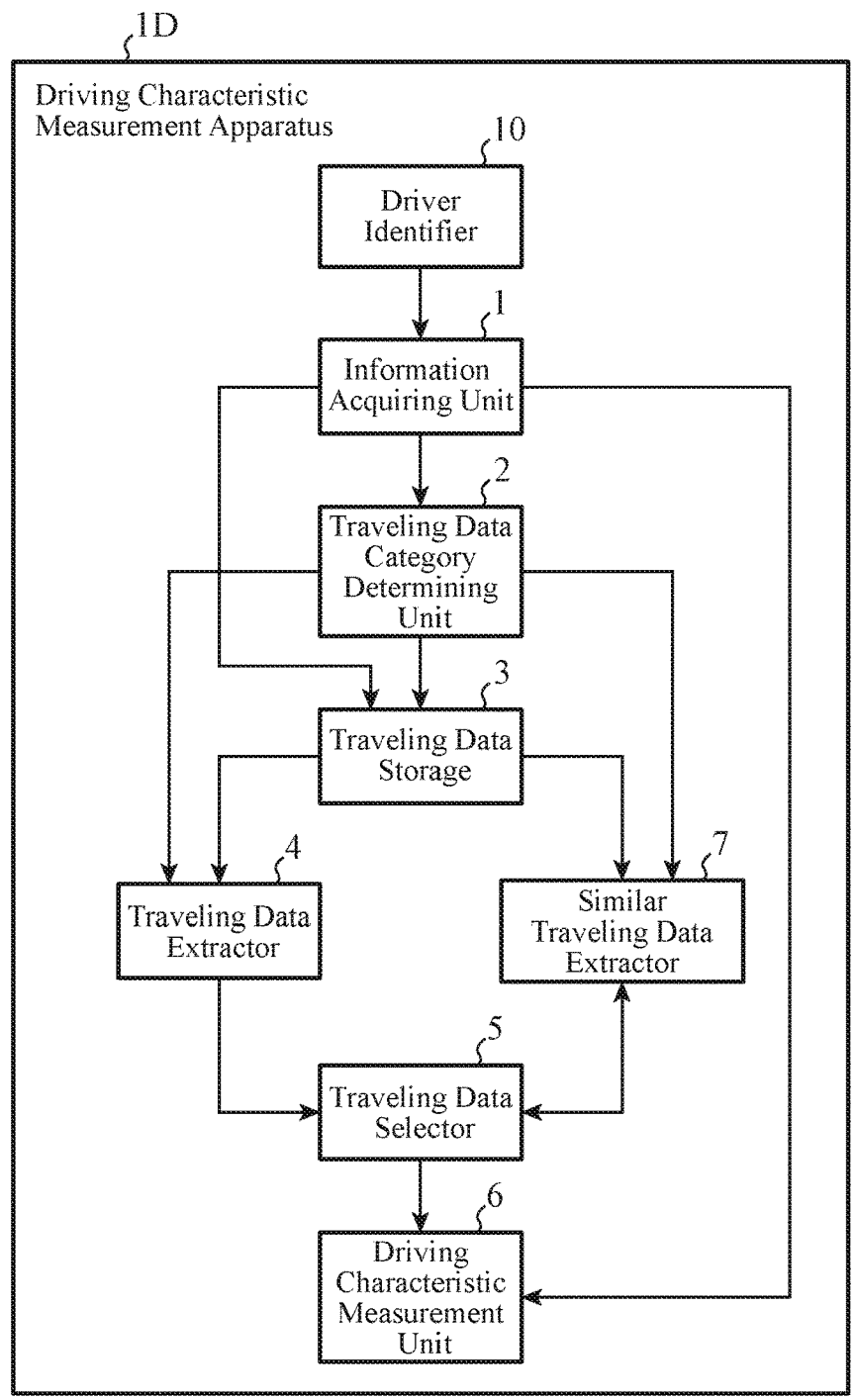
FIG. 13 is a block diagram illustrating an exemplary configuration of a driving characteristic measurement apparatus according to a seventh embodiment of the invention.

FIG. 13 is a block diagram illustrating a configuration of a driving characteristic measurement apparatus 1D according to the seventh embodiment for carrying out the invention.

The driving characteristic measurement apparatus 1D according to the seventh embodiment illustrated in FIG. 13 has a configuration in which a driver identifier 10 is added to the configuration of the driving characteristic measurement apparatus 1A according to the first embodiment illustrated in FIG. 1. A function of the driver identifier 10 is implemented by the reception device 103 and the processor circuit 101 illustrated in FIG. 17A, or by the reception device 103 and the processor 104 as illustrated in FIG. 17B.

Figure 14:
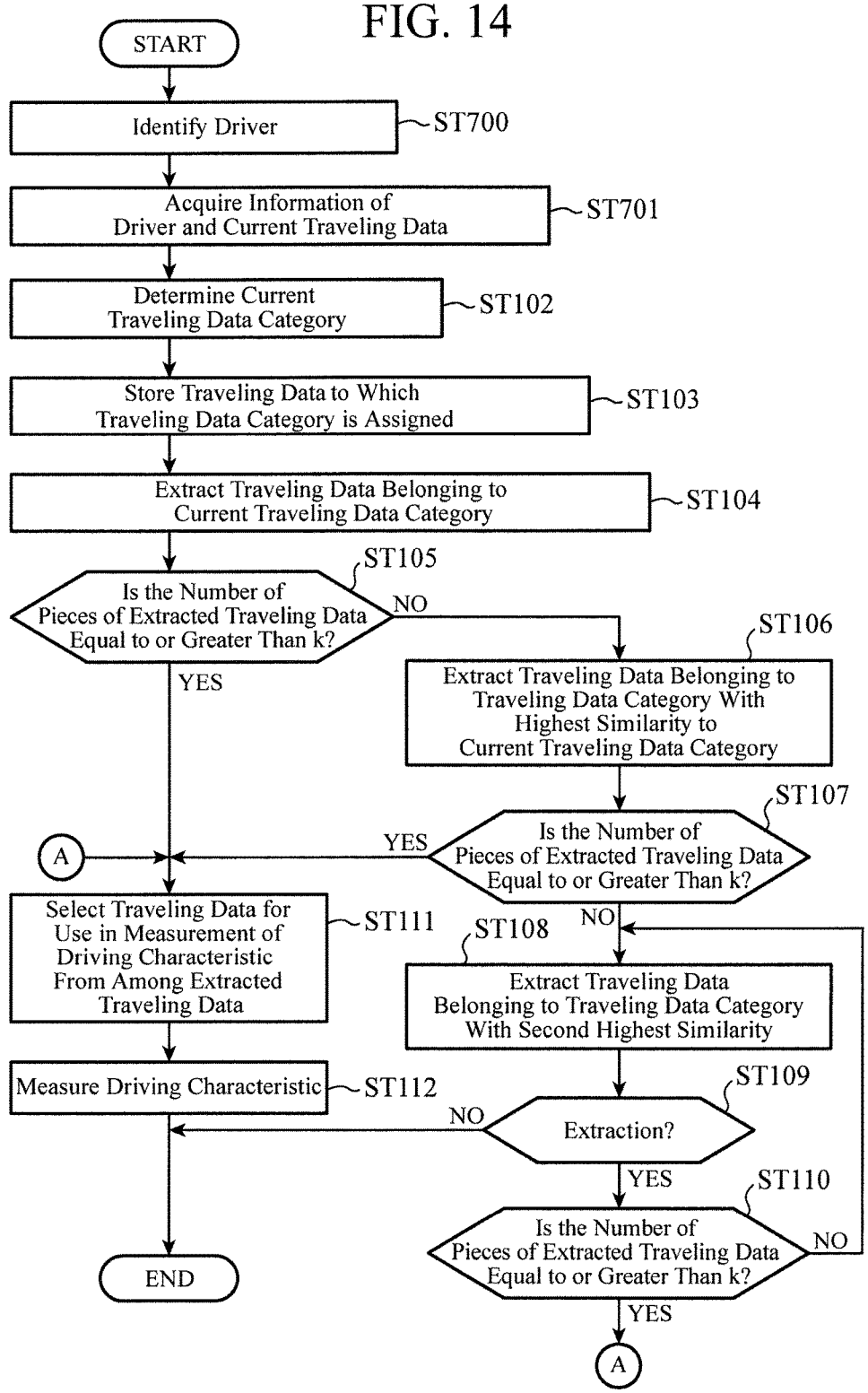
FIG. 14 is a flowchart illustrating exemplary operations of the driving characteristic measurement apparatus according to the seventh embodiment.

FIG. 14 is a flowchart illustrating operations in the seventh embodiment for carrying out the present invention. FIG. 14 is a diagram in which step ST700 is added to the head of the flowchart of FIG. 2 illustrated in the first embodiment, and step ST101 is replaced with step ST701.

In step ST700, the driver identifier 10 identifies the current driver and allocates a desired ID for each of the identified drivers. Methods of identification include a method of identifying by acquiring user information such as sex and name of the current driver input by the driver and a method of identifying by acquiring information such as the face or the body weight detected by a sensor or a camera.

In step ST701, the information acquiring unit 1 acquires traveling data and assigns information of the driver identified by the driver identifier 10 to the traveling data.

In the subsequent operation, the driving characteristic measurement apparatus 1D uses the traveling data to which the information of the driver currently driving is assigned.

For example, in step ST103, the traveling data storage 3 stores the traveling data to which a traveling data category and the information of the driver are assigned.

Furthermore, for example in step ST104, the traveling data extractor 4 extracts the current driver's traveling data from among traveling data belonging to the current traveling data category. In steps ST106 and ST108, the similar traveling data extractor 7 extracts the current driver's traveling data from among traveling data belonging to a traveling data category similar to the current traveling data category.

Operations other than the above are regarded as similar to those in the first embodiment, and thus descriptions thereof are omitted.

As described above, according to the seventh embodiment, the driving characteristic measurement apparatus 1D further includes the driver identifier 10 configured to identify a driver of the vehicle, and the driving characteristic measurement unit 6 measures a driving characteristic for each driver identified by the driver identifier 10. Therefore, it is possible to measure a driving characteristic with high credibility for each driver.

Eighth Embodiment

A driving characteristic measurement apparatus according to an eighth embodiment corrects driving characteristics according to a condition of a driver under a predetermined condition.

Figure 15:
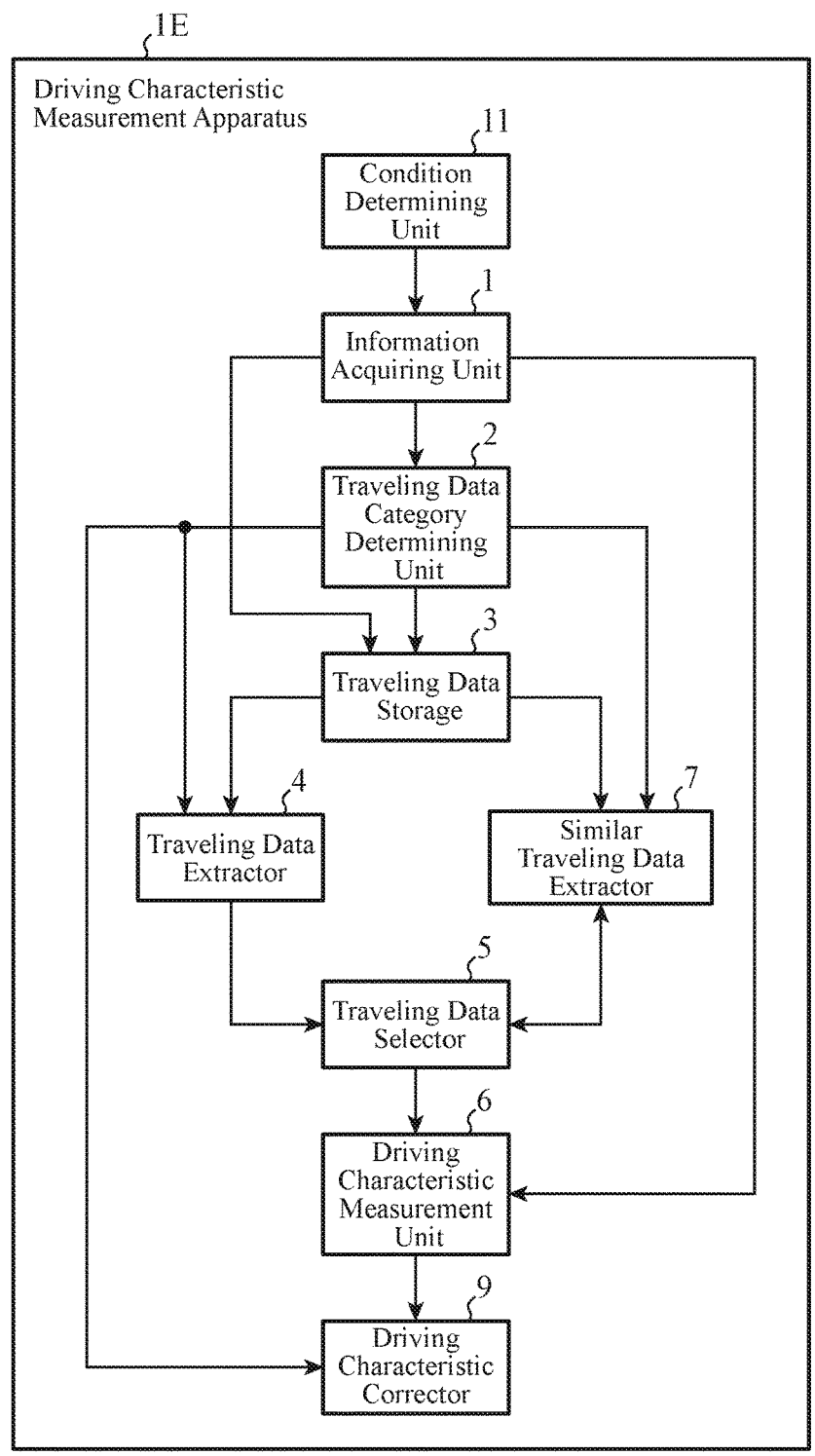
FIG. 15 is a block diagram illustrating an exemplary configuration of a driving characteristic measurement apparatus according to an eighth embodiment of the invention.

FIG. 15 is a block diagram illustrating a configuration of a driving characteristic measurement apparatus 1E according to the eighth embodiment for carrying out the invention.

An information acquiring unit 1 according to the eighth embodiment illustrated in FIG. 15 has a configuration in which a driving characteristic corrector 9 and a condition determining unit 11 are added to the configuration of the driving characteristic measurement apparatus 1A according to the first embodiment illustrated in FIG. 1. The function of the driving characteristic corrector 9 is implemented by the processor circuit 101 illustrated in FIG. 17A or the processor 104 illustrated in FIG. 17B. A function of the condition determining unit 11 is implemented by the reception device 103 and the processor circuit 101 illustrated in FIG. 17A, or by the reception device 103 and the processor 104 illustrated in FIG. 17B.

Figure 16:
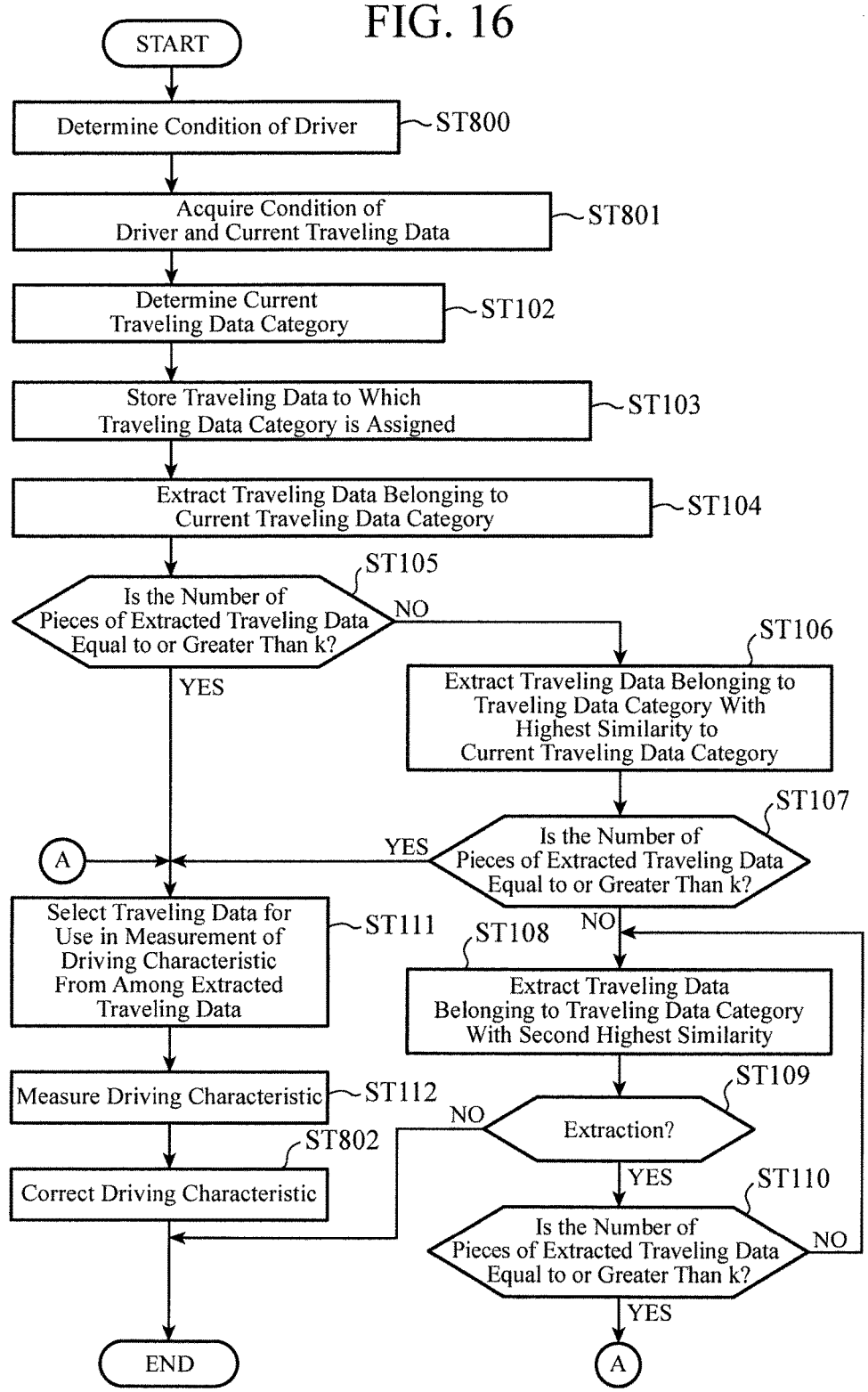
FIG. 16 is a flowchart illustrating exemplary operations of the driving characteristic measurement apparatus according to the eighth embodiment.

FIG. 16 is a flowchart illustrating operations in the eighth embodiment for carrying out the present invention. FIG. 16 is a diagram in which step ST800 is added to the head of the flowchart of FIG. 2 illustrated in the first embodiment, step ST802 is added to the end, and step ST101 is replaced with step ST801.

In step ST800, the condition determining unit 11 determines the condition of a driver. The condition of a driver includes drowsiness, fatigue, or impatience. Methods of determining the condition of a driver include a method of determining by acquiring information representing the current condition input by the driver and a method of determining by acquiring a measurement result from a body sensor that measures a heartbeat or the like.

In step ST801, an information acquiring unit 1 acquires traveling data and assigns the driver's condition information determined by the condition determining unit 11 to the traveling data.

In the subsequent operation, the driving characteristic measurement apparatus 1E uses the traveling data to which the condition information of the driver currently driving is assigned.

For example, in step ST103, the traveling data storage 3 stores the traveling data to which a traveling data category and the driver's condition information are assigned.

Furthermore, for example in step ST104, a traveling data extractor 4 extracts the traveling data to which the same condition information as that of the current driver among traveling data belonging to the current traveling data category is assigned. In steps ST106 and ST108, the similar traveling data extractor 7 extracts the traveling data to which the same condition information as that of the current driver among traveling data belonging to a traveling data category similar to the current traveling data category is assigned.

In step ST802, the driving characteristic corrector 9 determines whether a predetermined condition is satisfied from the traveling data acquired by the information acquiring unit 1, and in the case where the vehicle is traveling under the predetermined condition, the driving characteristic corrector 9 corrects the measurement result of the driving characteristic measurement unit 6 in accordance with the driver's condition information assigned to the traveling data.

Note that the operation of step ST802 may be omitted in the present embodiment.

In the present embodiment, the predetermined condition is, for example, a situation in which a resting point such as a service area or a parking area does not exist for a certain distance in the traveling direction upon traveling on a highway, that is, a situation in which the vehicle cannot stop immediately. Alternatively, the predetermined condition is a situation that requires extra attention to driving than usual such as a situation of traveling on a mountain road, a situation of traveling at night, or a situation of traveling in a bad weather such as rain or snow.

The predetermined condition may be determined in advance or the condition may be updated at any time during operation of the present driving characteristic measurement apparatus. For example, an area where the driver frequently becomes sleepy may be stored, and the time of traveling in the area may be set as a predetermined condition. Alternatively, an area or a situation in which a plurality of drivers are corrected of driving characteristics may be collected by using cloud computing, and an area or a situation with a large number of corrections may be set as a predetermined condition.

In the present embodiment, the driving characteristic corrector 9 corrects a measurement result of driving characteristics according to the condition of a driver, for example, when a condition of the driver under the predetermined condition is drowsiness, determination of excess speed is allowed to be stricter. The correction method may be determined in advance for each condition of a driver.

Operations other than the above are regarded as similar to those in the first embodiment, and thus descriptions thereof are omitted.

As described above, according to the eighth embodiment, the driving characteristic measurement apparatus 1E further includes the condition determining unit 11 configured to determine a condition of a driver of the vehicle, and the driving characteristic measurement unit 6 measures driving characteristics for each condition of the driver determined by the condition determining unit 11. Therefore, it is possible to measure driving characteristics with high credibility for each condition of the driver.

According to the eighth embodiment, the driving characteristic measurement apparatus 1E further includes the driving characteristic corrector 9 configured to correct the driving characteristic measured by the driving characteristic measurement unit 6 in accordance with the condition of the driver determined by the condition determining unit 11 when a situation of a road on which the vehicle is currently traveling fulfills a predetermined condition. When the driver is in a special situation such as being unable to stop immediately due to a situation of the road despite feeling a physical abnormality such as fatigue or drowsiness during traveling, the optimal driving characteristics can be measured in accordance with the driver's condition.

Note that, within the scope of the present invention, the present invention may include a flexible combination of the respective embodiments, a modification of any component of the respective embodiments, or omission of any component in the respective embodiments.

INDUSTRIAL APPLICABILITY

Even in a case where the number of times of traveling in a similar road situation in the past to that of the currently traveling road is small or never been traveled at all, the driving characteristic measurement apparatus according to this invention measures driving characteristics with high credibility and thus is suitable for use as a driving support device or the like for performing driving support on the basis of driving characteristics of a driver.

REFERENCE SIGNS LIST

1A to 1E: driving characteristic measurement apparatus; 1: Information acquiring unit; 2: Traveling data category determining unit; 3: Traveling data storage; 4: Traveling data extractor; 5: Traveling data selector; 6: Driving characteristic measurement unit; 7: Similar traveling data extractor; 8: Reliability determining unit; 9: Driving characteristic corrector; 10: Driver identifier; 11: Condition determining unit; 101: Processor circuit; 102: Memory; 103: Reception device; and 104: Processor.

The invention claimed is:

1. A driving characteristic measurement apparatus, comprising:
   an information acquiring unit to acquire traveling data that includes both information on a situation of a road on which a vehicle is currently traveling and information on a driving maneuver of the vehicle;
   a traveling data category determining unit to determine a category of current traveling data on a basis of the information on the situation of the road included in the current traveling data acquired by the information acquiring unit;
a traveling data storage to assign the category determined by the traveling data category determining unit to the current traveling data for storage therein;
a traveling data extractor to extract traveling data belonging to a same category as the category of the current traveling data, from the traveling data storage;
a similar traveling data extractor to extract traveling data belonging to a category similar to the category of the current traveling data, from the traveling data storage;
a traveling data selector to select the traveling data extracted by the traveling data extractor when the number of pieces of the traveling data extracted by the traveling data extractor is equal to or greater than a first number being predetermined, and to, when the number of said pieces of the traveling data is less than the first number, select traveling data whose number of pieces is not less than the first number, from among the traveling data extracted by the similar traveling data extractor; and
a driving characteristic measurement unit to measure a driving characteristic on a current traveling road, using the traveling data selected by the traveling data selector.

2. A driving characteristic measurement apparatus comprising:
an information acquiring unit to acquire traveling data that includes both information on a situation of a road on which a vehicle is currently traveling and information on a driving maneuver of the vehicle;
a traveling data category determining unit to determine a category of current traveling data on a basis of the information on the situation of the road included in the current traveling data acquired by the information acquiring unit;
a traveling data storage to assign the category determined by the traveling data category determining unit to the current traveling data for storage therein;
a traveling data extractor to extract traveling data belonging to a same category as the category of the current traveling data, from the traveling data storage;
a similar traveling data extractor to extract traveling data belonging to a category similar to the category of the current traveling data, from the traveling data storage;
a traveling data selector to select the traveling data extracted by the traveling data extractor when the number of pieces of the traveling data extracted by the traveling data extractor is equal to or greater than a first number being predetermined, and to, when the number of said pieces of the traveling data extracted by the traveling data extractor is less than the first number, select the traveling data extracted by the traveling data extractor as well as the traveling data extracted by the similar traveling data extractor; and
a driving characteristic measurement unit to measure a driving characteristic on a current traveling road, using the traveling data selected by the traveling data selector.

3. The driving characteristic measurement apparatus according to claim 1, further comprising a reliability determining unit to determine a reliability of each piece of traveling data, wherein
the traveling data selector preferentially selects traveling data with a high reliability on a basis of a determination result of the reliability determining unit.

4. The driving characteristic measurement apparatus according to claim 1, wherein:
the similar traveling data extractor extracts traveling data belonging to each category from the traveling data storage in descending order of similarity to the category of the current traveling data; and
when the number of said pieces of traveling data extracted by the traveling data extractor is less than the first number, the traveling data selector selects, among the categories of the traveling data extracted by the similar traveling data extractor, traveling data of a category which has a highest similarity and to which the traveling data whose number of pieces is not less than the first number belongs.

5. The driving characteristic measurement apparatus according to claim 1, wherein:
the similar traveling data extractor extracts traveling data belonging to each category from the traveling data storage in descending order of similarity to the category of the current traveling data; and
when the number of pieces of traveling data extracted by the traveling data extractor is less than the first number, the traveling data selector selects, among the categories of the traveling data extracted by the similar traveling data extractor, traveling data whose number of pieces becomes equal to or greater than the first number when pieces of traveling data belonging to one or more categories having high similarity are summed up.

6. The driving characteristic measurement apparatus according to claim 1, further comprising a driving characteristic corrector to, when the driving characteristic measurement unit measures the driving characteristic on a current traveling road using the traveling data extracted by the similar traveling data extractor, extract a difference between a situation of a road indicated by the traveling data extracted by the similar traveling data extractor and the situation of the current traveling road, and to correct the driving characteristic to thereby reduce influence of the extracted difference.

7. The driving characteristic measurement apparatus according to claim 1, wherein, when the number of said pieces of the traveling data extracted by the traveling data extractor is less than the first number, the traveling data selector selects the traveling data extracted by the similar traveling data extractor if the number of pieces of the traveling data extracted by the similar traveling data extractor is equal to or greater than a predetermined second number smaller than the first number, and does not select the traveling data extracted by the similar traveling data extractor to prohibit measurement of a driving characteristic if the number of pieces of the traveling data extracted by the similar traveling data extractor is less than the second number.

8. The driving characteristic measurement apparatus according to claim 1, further comprising a driver identifier to identify a driver of the vehicle, wherein
the driving characteristic measurement unit measures a driving characteristic for each driver identified by the driver identifier.

9. The driving characteristic measurement apparatus according to claim 1, further comprising a condition determining unit to determine a condition of a driver of the vehicle, wherein
the driving characteristic measurement unit measures a driving characteristic for each condition of the driver determined by the condition determining unit.

10. The driving characteristic measurement apparatus according to claim 9, further comprising a driving characteristic corrector to correct the driving characteristic measured by the driving characteristic measurement unit in accordance with the condition of the driver determined by the condition determining unit when the situation of the road on which the vehicle is currently traveling fulfills a predetermined condition.

11. The driving characteristic measurement apparatus according to claim 2, further comprising a driving characteristic corrector to, when the driving characteristic measurement unit measures the driving characteristic on a current traveling road using the traveling data extracted by the similar traveling data extractor, extract a difference between a situation of a road indicated by the traveling data extracted by the similar traveling data extractor and the situation of the current traveling road, and to correct the driving characteristic to thereby reduce influence of the extracted difference.

12. The driving characteristic measurement apparatus according to claim 2, wherein, when the number of said pieces of the traveling data extracted by the traveling data extractor is less than the first number, the traveling data selector selects the traveling data extracted by the similar traveling data extractor if the number of pieces of the traveling data extracted by the similar traveling data extractor is equal to or greater than a predetermined second number smaller than the first number, and does not select the traveling data extracted by the similar traveling data extractor to prohibit measurement of a driving characteristic if the number of pieces of the traveling data extracted by the similar traveling data extractor is less than the second number.

13. The driving characteristic measurement apparatus according to claim 2, further comprising a driver identifier to identify a driver of the vehicle, wherein
the driving characteristic measurement unit measures a driving characteristic for each driver identified by the driver identifier.

14. The driving characteristic measurement apparatus according to claim 2, further comprising a condition determining unit to determine a condition of a driver of the vehicle, wherein
the driving characteristic measurement unit measures a driving characteristic for each condition of the driver determined by the condition determining unit.

15. The driving characteristic measurement apparatus according to claim 14, further comprising a driving characteristic corrector to correct the driving characteristic measured by the driving characteristic measurement unit in accordance with the condition of the driver determined by the condition determining unit when the situation of the road on which the vehicle is currently traveling fulfills a predetermined condition.

* * * * *